US008248664B2

(12) United States Patent
Sato

(10) Patent No.: US 8,248,664 B2
(45) Date of Patent: Aug. 21, 2012

(54) IMAGE PROCESSING APPARATUS AND METHOD FOR ACHROMATIZING PIXEL BASED ON EDGE REGION OF COLOR SIGNAL

(75) Inventor: Hideo Sato, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 849 days.

(21) Appl. No.: 12/354,496

(22) Filed: Jan. 15, 2009

(65) Prior Publication Data

US 2009/0190193 A1 Jul. 30, 2009

(30) Foreign Application Priority Data

Jan. 25, 2008 (JP) ................................ 2008-015511

(51) Int. Cl.
*G06T 5/00* (2006.01)
(52) U.S. Cl. ........ 358/3.26; 358/2.1; 358/1.9; 358/2.99; 358/3.01; 358/3.27; 358/518; 358/538; 382/162; 382/163; 382/167
(58) Field of Classification Search .................... 358/2.1, 358/3.01, 518, 538, 1.9, 2.99, 3.26, 512, 358/515; 382/162, 163, 167, 256, 258, 266
See application file for complete search history.

(56) References Cited

U.S. PATENT DOCUMENTS 5,398,124 A * 3/1995 Hirota ........................... 358/530
2008/0002766 A1 * 1/2008 Suwa et al. ............... 375/240.12

FOREIGN PATENT DOCUMENTS

JP 2000-151937 A 5/2000

* cited by examiner

*Primary Examiner* — King Poon
*Assistant Examiner* — Jamares Q Washington
(74) *Attorney, Agent, or Firm* — Canon U.S.A., Inc. IP Division

(57) ABSTRACT

An image processing apparatus performs a first edge determination to determine whether each pixel is an edge of a black character or a thin black line based on a pixel signal of a predetermined color in each pixel included in multi-valued image data. The image processing apparatus determines whether to achromatize a pixel signal of each pixel included in the multi-valued image data based on a result of the first edge determination, and achromatizes a pixel determined to be achromatized. The image processing apparatus performs a second edge determination for determining whether each pixel is an edge based on a pixel signal of a color different from the predetermined color in each pixel included in the multi-valued image data. The image processing apparatus corrects the multi-valued image data based on a result of the second edge determination after completing achromatization of the pixel determined to be achromatized.

2 Claims, 20 Drawing Sheets

DETERMINATION SIGNAL COLOR1 TO BE INPUT
TO COLOR DETERMINATION SIGNAL OUTPUT UNIT

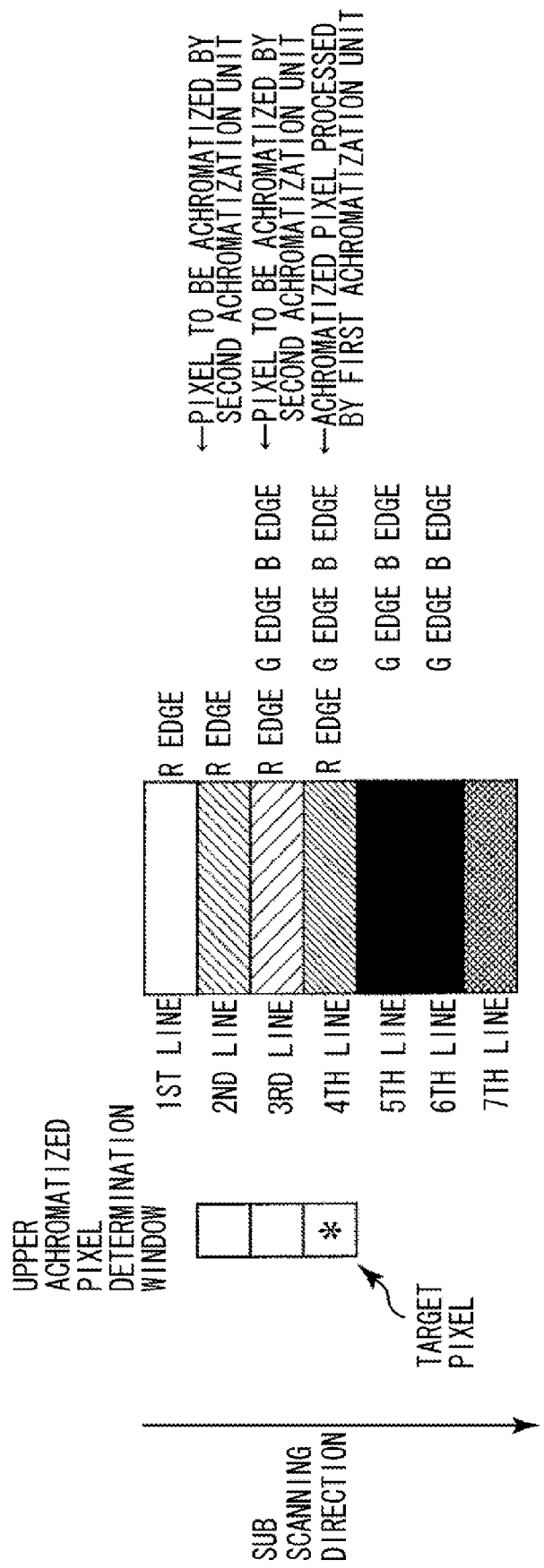

IMAGE PROCESSING APPARATUS AND METHOD FOR ACHROMATIZING PIXEL BASED ON EDGE REGION OF COLOR SIGNAL

BACKGROUND OF THE INVENTION

1. Field of the Invention

The present invention relates to an image processing apparatus and a method for processing image information acquired by an image reading apparatus configured to perform spectrometric scanning to optically read color image information from a document. More specifically, the present invention relates to a method for determining a color blur pixel as an achromatic color when an achromatic edge portion is optically read from a color document.

2. Description of the Related Art

FIGS. 1 and 2 illustrate two representative arrangements of the image reading apparatus configured to perform spectrometric scanning to optically read color image information from a document.

FIG. 1 illustrates an internal configuration of an image reading apparatus including a reducing optical system.

A document 12 can be placed on a document positioning plate 11, which is made of glass. A light source unit 15 includes a light source 13 and a reflection mirror 14, which are mechanically fixed to the casing of the light source unit 15. The light source unit 15 can move in a direction indicated by an arrow P. The light source unit 15, the incorporated light source 13 and the reflection mirror 14 have a width equivalent to or longer than the width of the document 12 to be read (i.e., the size in a direction perpendicular to the drawing surface of FIG. 1).

An arrow Q indicates the optical path of light emitted from the light source 13. The light emitted from the light source 13 illuminates the document 12 via the document positioning plate 11. Reflection light according to a spectral reflectance of the document 12 is incident on the reflection mirror 14. The reflection mirror 14 changes the optical path of the reflection light so that the reflection light can pass through a reducing lens 16. The reducing lens 16 can reduce the reflection light having a width equivalent to or wider than the document 12. The reflection light reduced by the reducing lens 16 reaches a photoelectric conversion element 17.

The photoelectric conversion element 17 is, for example, a charge-coupled device (CCD) sensor or a complementary metal-oxide semiconductor (CMOS) sensor, which is a semiconductor element capable of converting input light information into an electric signal. The photoelectric conversion element 17 has a width narrower than that of the document 12. The reducing lens 16 has a reduction rate determined considering a ratio of the width of the document 12 to the width of the photoelectric conversion element 17.

The light source unit 15 and the reducing lens 16 synchronously move in directions indicated by arrows P and T to scan the document 12, while the photoelectric conversion element 17 generates electronic data.

FIG. 2 illustrates an example internal configuration of an image reading apparatus including an equal magnification optical system.

A contact image sensor (CIS) unit 22 includes a light source 13, an equal magnification lens 21, and a photoelectric conversion element 23, which are mechanically fixed to the casing of the CIS unit 22. The CIS unit 22 moves in a direction indicated by an arrow U. The photoelectric conversion element 23 is, for example, a CCD sensor or a CMOS sensor, which is a semiconductor element capable of converting input light information into an electric signal. The CIS unit 22, the incorporated light source 13, the equal magnification lens 21, and the photoelectric conversion element 23, has a width equivalent to or longer than the width of the document 12 to be read (i.e., the size in a direction perpendicular to the drawing surface of FIG. 1). An arrow V indicates the optical path of light emitted from the light source 13.

The light emitted from the light source 13 illuminates the document 12 via the document positioning plate 11. Reflection light according to a reflectance of the document 12 is incident on the equal magnification lens 21. The incident light has a width equivalent to or wider than the width of the document 12 and reaches the photoelectric conversion element 23 via the equal magnification lens 21. The CIS unit 22 moves in a direction indicated by an arrow U to scan the document 12 while photoelectric conversion element 22 generates electronic data.

In general, an optical system usable for a method for generating electronic data of colors includes a light source serving as the light source 13, which can generate light having a wavelength in the visible range. Furthermore, the optical system includes color separation filters of red (R), green (G), and blue (B), i.e., three primary colors, associated with three photoelectric conversion element arrays (line sensors) respectively, which can serve as the photoelectric conversion element 17 or 23. The optical system can be used to scan the document 12 and generate color electronic data by combining RGB pixel signals obtained by respective line sensors.

FIG. 3 illustrates a representative configuration of the photoelectric conversion element 17.

The photoelectric conversion element 17 includes three line sensors dedicated to R, G, and B colors, i.e., a line sensor (R) 31, a line sensor (G) 32, and a line sensor (B) 33, which can detect three (R, G, B) color components to capture a composite color image. Each line sensor includes a predetermined number of pixels arrayed in a main scanning direction, which constitute a light-receiving portion for reading an image of a document with a predetermined resolution.

When the resolution is 600 dpi, an area of approximately 42 μm×42 μm on a document corresponds to one pixel on electronic data.

When these line sensors are disposed on a semiconductor, a distance equal to or greater than 0 μm is required between two line sensors. When the distance between two line sensors is 0 μm, the delay amount is equal to one line that corresponds to the distance between the centroids of two line sensors. If the distance is larger than 0, the delay amount is equal to n lines (n=integer) that is the distance between two lines projected on a document.

FIG. 4 illustrates an example RGB image capturing method in a case where the delay amount is n=2. While the light source unit 15 or the CIS unit 22 is moving in the sub scanning direction, the line sensor (R) 31 reads a target line M=m at time T=t. In this case, the line sensor (G) 32 reads the (m−2)th line and the line sensor (B) 33 reads the (m−4)th line. After a unit time has elapsed, i.e., at time T=t+1, the line sensor (R) 31 reads the (m+1)th line, the line sensor (G) 32 reads the (m−1)th line, and the line sensor (B) 33 reads the (m−3)th line. The photoelectric conversion element 17 repeats the similar operation and completes reading R, G, and B data from the target line M=m at time T=t+4 after starting the operation at time T=t. During this period (T=t to T=t+4), i.e., before completing the reading of the B line data, a line buffer (not illustrated) holds the R and G line data. When the reading of the R, G, and B data is completed at the time T=t+4, a color image of the target line M=m can be obtained.

The above-described description can be applied similarly to any other case where the delay amount is not n=2, although the time required to obtain R, G, and B data of a target line is variable depending on the delay amount. The capacity of the line buffer is required to be changed correspondingly.

To accurately capture a color image of a document as electronic data, it is important to synchronize the timing of the photoelectric conversion element 17 or 23 storing electric charge for each line with a moving amount of the light source unit 15 or the CIS unit 22 in the sub scanning direction.

For example, the above-described movement of the light source unit 15 or the CIS unit 22 in the sub scanning direction can be realized by a stepping motor. When the stepping motor is used, the image reading apparatus is not free from color misregistration randomly appearing in the sub scanning direction, which is a phenomenon occurring due to various factors such as irregularity in rotation, vibration in a driving/transmission mechanism (e.g., gears and belts), and vibration or disturbance at other frictional portion.

The color misregistration refers to deviations among reading lines of the line sensor (R) 31, the line sensor (G) 32, and the line sensor (B) 33.

The color misregistration may also occur when the delay amount between the lines is extremely large. For example, when n=12, the difference in reading time between R and B data is equivalent to the time corresponding to 24 lines. During such a long time, variations in the image reading state caused by the above-described mechanical factors tend to become significantly larger.

From the foregoing, to accomplish the color image reading operation accurately, it is desired to read R, G, and B data of a target line within a short time using an accurate driving mechanism. However, the cost increases if the driving mechanism is required to attain a higher reading accuracy.

FIG. 5 illustrates R, G, and B luminance level signals of a target pixel obtained when the photoelectric conversion element 17 performs reading processing on a document including a thin black line (including a black character) area in contrast with a white background.

In FIG. 5, dotted lines indicate sampling lines along which the line sensor (R) 31, the line sensor (G) 32, and the line sensor (B) 33 perform document reading processing. If no color misregistration occurs in the document reading operation, the luminance levels of R, G, and B are identical to each other. In such a case, when the sensor reads a boundary between white and black areas (i.e., an edge portion) on a document, the sensor generates a signal representing a halftone gray similar to an achromatic color. When the sensor reads the fifth line or a subsequent line, the sensor generates a signal representing a gray having a lower luminance. FIG. 6 illustrates electronic data obtained by the reading operation illustrated in FIG. 5.

The electronic data obtained in this manner can be used in a chromatic/achromatic color determination described below, according to which the target pixel on the fourth line can be identified as an achromatic color. FIG. 7 illustrates R, G, and B luminance level signals of a target pixel obtained when the color misregistration is present in the sub scanning direction. According to the example illustrated in FIG. 7, sampling timing of the line sensor (R) 31 is one line earlier than the sampling timing of the line sensor (G) 32 or the line sensor (B) 33 in the vicinity of an edge portion on the document.

In this case, the luminance levels of R, G, and B on the third line and the fourth line are not identical to each other. The luminance level of the R channel is constantly lower than the luminance levels of other two channels. FIG. 8 illustrates electronic data obtained by the reading operation illustrated in FIG. 7, in which each of the third line and the fourth line is a saturated halftone color, i.e., a color blur.

The color blur at an achromatic edge portion caused by the color misregistration phenomenon deteriorates the quality of image data read by the line sensors or weakens the "auto color select (ACS)" function usable to determine whether a document is a color document.

As discussed in Japanese Patent Application Laid-Open No. 2000-151937, there is a conventional method for performing achromatic color determination on a color blur pixel caused by the color misregistration. The method includes extracting an edge from a Y(0.25R+0.5G+0.25B) signal representing the luminance, determining an achromatic area from an RGB signal, determining an edge and achromatic area as a thin black line or a black character region, and performing achromatization on the determined area.

However, the above-described conventional method includes the problems described next.

It is now assumed that an R signal, a G signal, and a B signal deviate from each other as illustrated in FIG. 19 due to the color misregistration caused by a scanner when reading a document including a black area with a while background. In this case, reading of the R signal is advanced. The level of the R signal greatly decreases at the third line while the G signal and the B signal read the white background. The electronic data obtained by combining the R signal with the G and B signals has a value indicating a bright cyan. As described above, when the signal levels of three channels are not identical to each other, the white area cannot be identified as an achromatic area. Hence, this area cannot be determined as a thin black line or a black character region, and cannot be achromatized.

SUMMARY OF THE INVENTION

Exemplary embodiments of the present invention are directed to an image processing apparatus and a method capable of monochromizing an achromatic edge portion on a document even when an input image of the document has a large color misregistration in the sub scanning direction.

According to an aspect of the present invention, an image processing apparatus includes a color determination unit configured to determine whether each pixel is monochrome or color based on a pixel signal of each pixel included in multi-valued image data, a first edge determination unit configured to determine whether each pixel is an edge of a black character or a thin black line based on a pixel signal of a predetermined color in each pixel included in the multi-valued image data, an achromatization unit configured to determine whether to achromatize the pixel signal of each pixel included in the multi-valued image data based on a result determined by the color determination unit and a result determined by the first edge determination unit and achromatize a pixel determined to be achromatized, a second edge determination unit configured to determine whether each pixel is the edge based on a pixel signal of a color different from the predetermined color in each pixel included in the multi-valued image data, and a correction unit configured to correct the multi-valued image data based on a result determined by the second edge determination unit after the achromatization unit has achromatized the pixel determined to be achromatized.

According to an aspect of the present invention, an image processing apparatus includes a first identification unit configured to identify a pixel to be achromatized among pixels included in multi-valued image data using a pixel signal of a predetermined color among the multi-valued image data, and a second identification unit configured to identify another pixel to be newly achromatized as the pixel to be achromatized among pixels within a predetermined distance from the pixel identified by the first identification unit to expand a range of the pixel to be achromatized so as to include a pixel not identified by the first identification unit as the pixel to be achromatized, wherein the pixel signal obtained from the pixel within the predetermined distance is a pixel signal of a color different from the pixel signal of the predetermined color.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments and features of the invention and, together with the description, serve to explain at least some of the principles of the invention.

FIG. 23 illustrates an example operation of an upper achromatized pixel determination window according to an exemplary embodiment of the present invention.

DETAILED DESCRIPTION OF THE EMBODIMENTS

Figure 1:
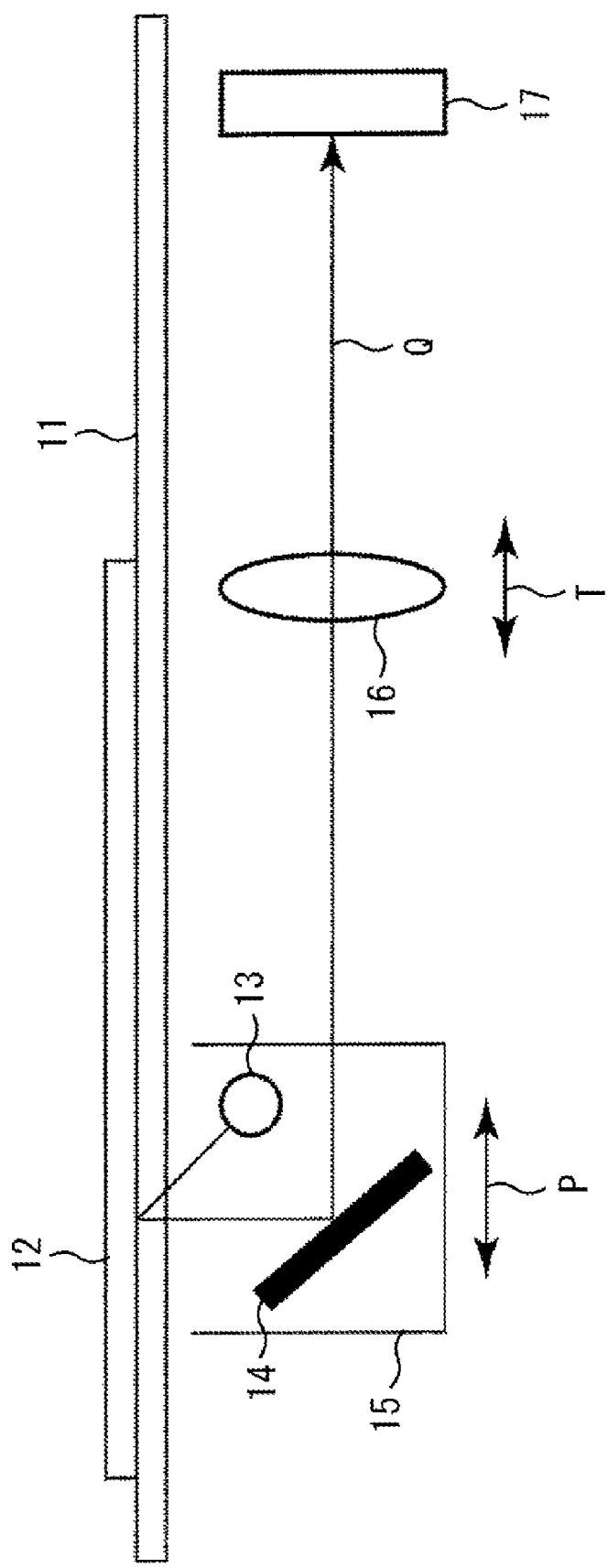
FIG. 1 illustrates an example image reading apparatus including a reducing optical system.

The following description of exemplary embodiments is illustrative in nature and is in no way intended to limit the invention, its application, or uses. It is noted that throughout the specification, similar reference numerals and letters refer to similar items in the following figures, and thus, once an item is described with respect to one figure, it may not be discussed for following figures. Exemplary embodiments will be described in detail below with reference to the drawings.

Figure 9:
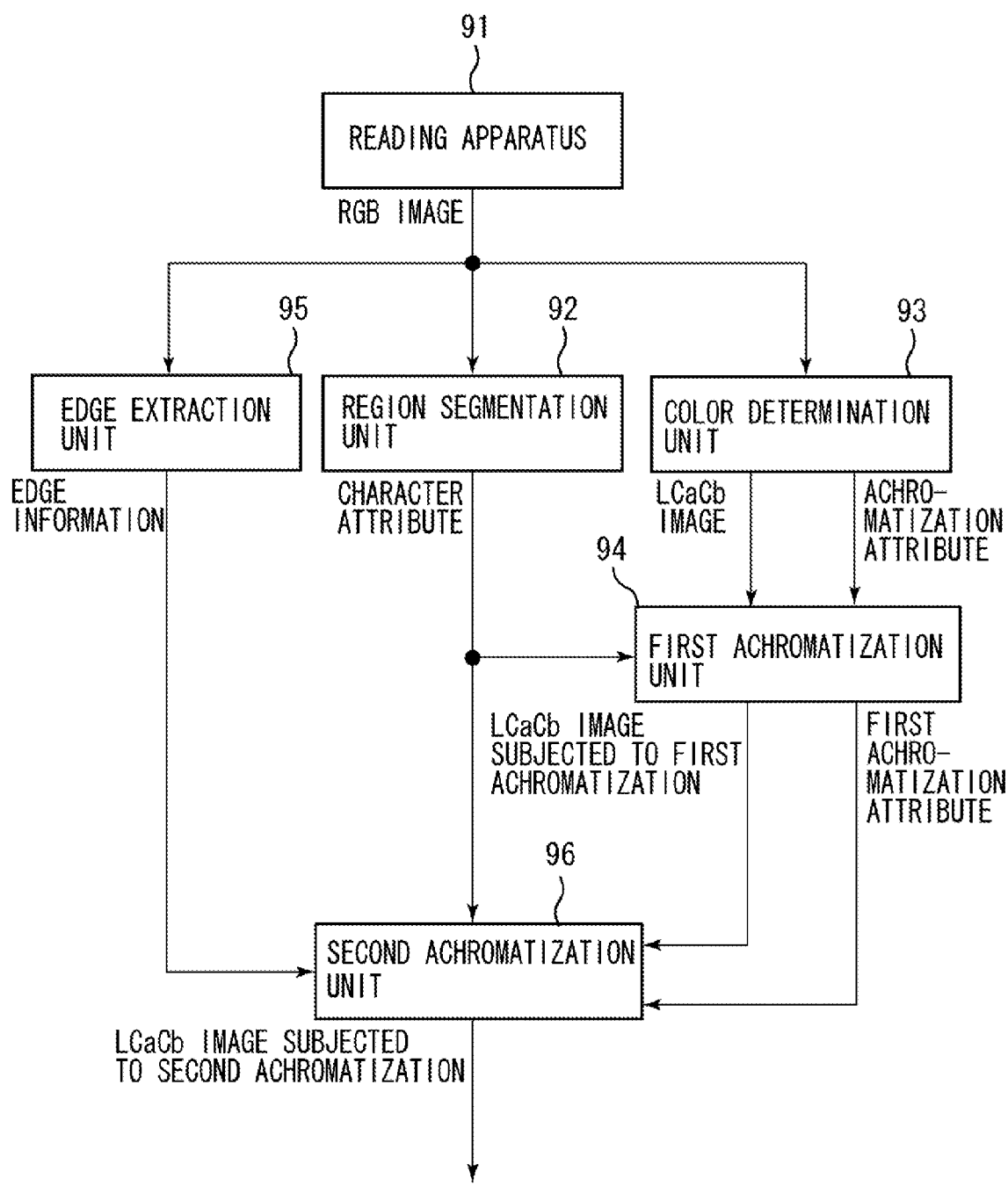
FIG. 9 is a block diagram illustrating an example image processing system for performing achromatization processing according to an exemplary embodiment of the present invention.

FIG. 9 is a block diagram illustrating an example image processing system performing achromatization processing according to an exemplary embodiment of the present invention.

A reading apparatus 91 performs spectrometric scanning to optically read color image information from a document. A region segmentation unit 92 extracts image features (e.g., a photo region, a text region, and a halftone region) from respective pixels of an input image, and generates data representing the attribute of each image area. A color determination unit 93 determines whether the input image is a chromatic color or an achromatic color for each pixel, and generates data representing an attribute of the identified chromatic color/achromatic color.

A first achromatization unit 94 determines a pixel to be achromatized based on the attribute data generated by the region segmentation unit 92 and the color determination unit 93, and achromatizes a corresponding pixel in the color image read by the reading apparatus 91. An edge extraction unit 95 extracts edge information from the color image read by the reading apparatus 91. A second achromatization unit 96 determines a pixel to be achromatized based on the edge information extracted by the edge extraction unit 95, image area attribute data generated by the region segmentation unit 92, and a processing result of the first achromatization unit 94. The second achromatization unit 96 achromatizes a corresponding pixel in the processing result of the first achromatization unit 94.

Figure 2:
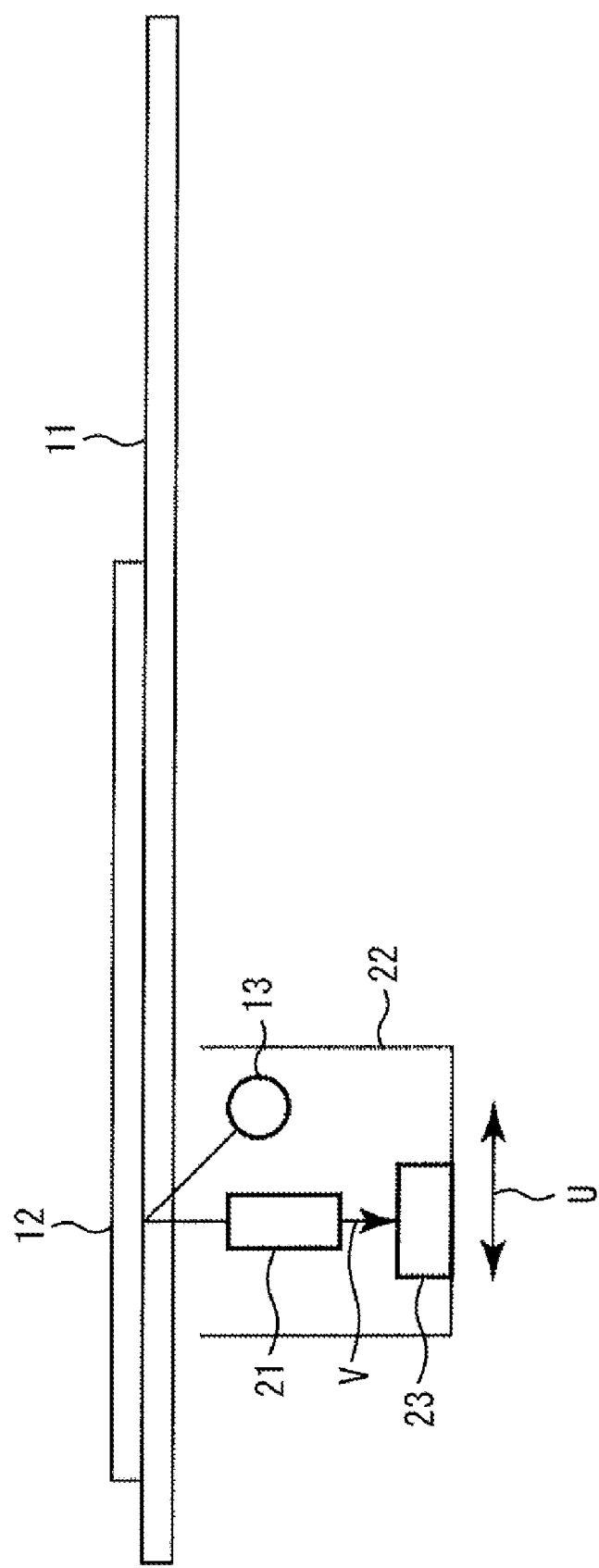
FIG. 2 illustrates an image reading apparatus including an equal magnification optical system.

The reading apparatus 91 is constituted by the image reading apparatus illustrated in FIGS. 1 and 2, which optically scans an image of a document and outputs R, G, and B luminance level signals.

Figure 10:
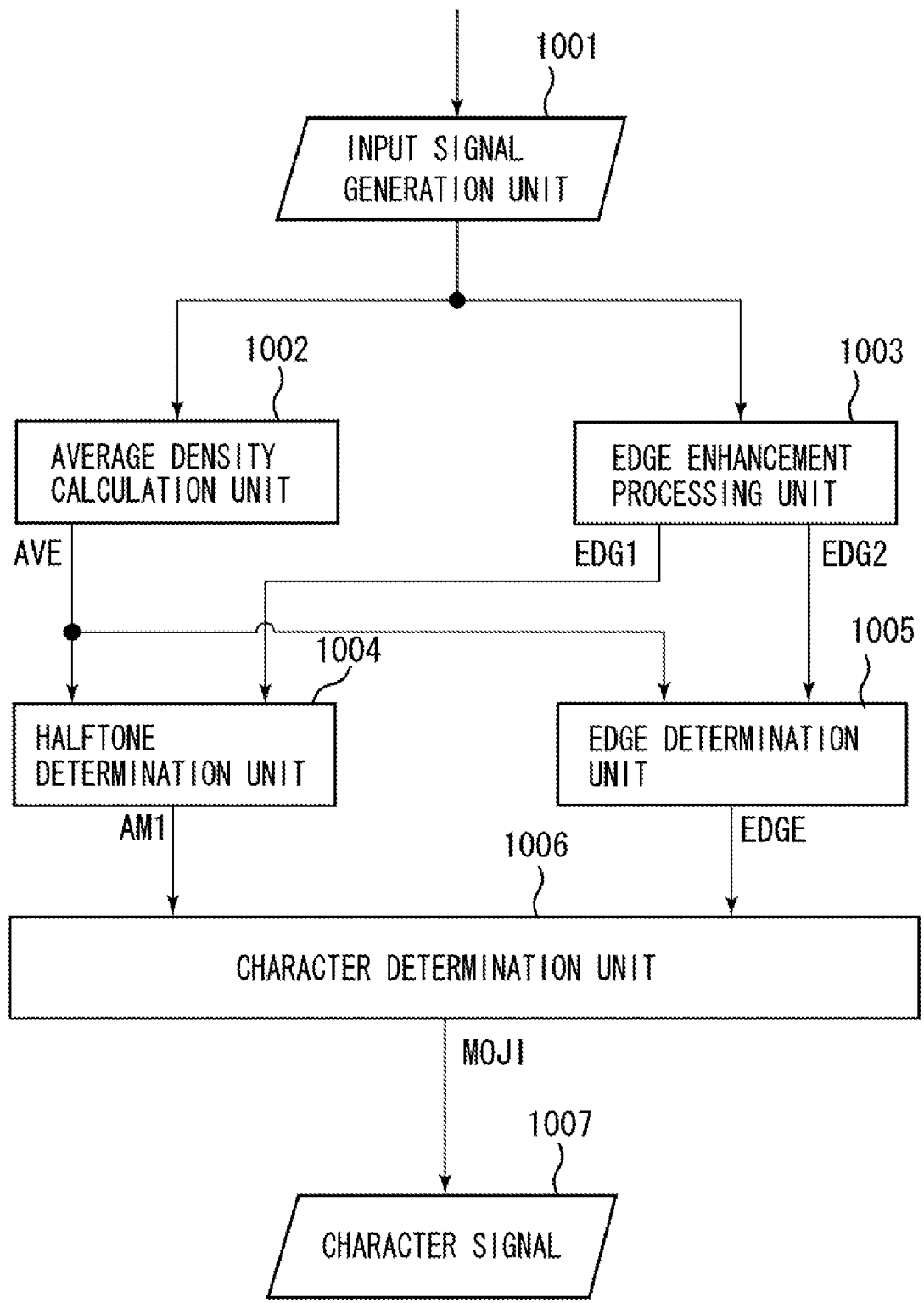
FIG. 10 is a block diagram illustrating example processing performed by a region segmentation unit according to an exemplary embodiment of the present invention.

The region segmentation unit 92 extracts an image feature from a document image to perform optimum image processing according to the extracted image feature, and generates a signal representing the image area attribute (hereinafter, referred to as "flag data"). In other words, the region segmentation unit 92 receives a color image signal from the reading apparatus 91 and detects an attribute of image data in the document image. Then, the region segmentation unit 92 generates flag data identifying the detected attribute. FIG. 10 illustrates an example processing procedure.

FIG. 10 is a block diagram illustrating an example method for extracting an image area attribute. An input signal generation unit 1001 receives RGB data and generates a signal to be processed. In this case, the input signal generation unit 1001 directly supplies a G channel signal to an average density calculation unit 1002 and an edge enhancement processing unit 1003.

The average density calculation unit 1002 calculates an average value AVE of pixel values of a plurality of pixels in an M×N area (M and N are natural numbers), which includes a target pixel at the center thereof, for each input signal.

The edge enhancement processing unit 1003 performs edge enhancement processing on the target pixel referring to data in a peripheral area in the M×N area. The edge enhancement processing unit 1003 calculates two types of edge enhancement signals EDG1 and EDG2, which are different in intensity.

The average density calculation unit 1002 sends calculation and processing results to a halftone determination unit 1004 and an edge determination unit 1005. Similarly, the edge enhancement processing unit 1003 sends calculation and processing results to the halftone determination unit 1004 and the edge determination unit 1005.

Figure 11:
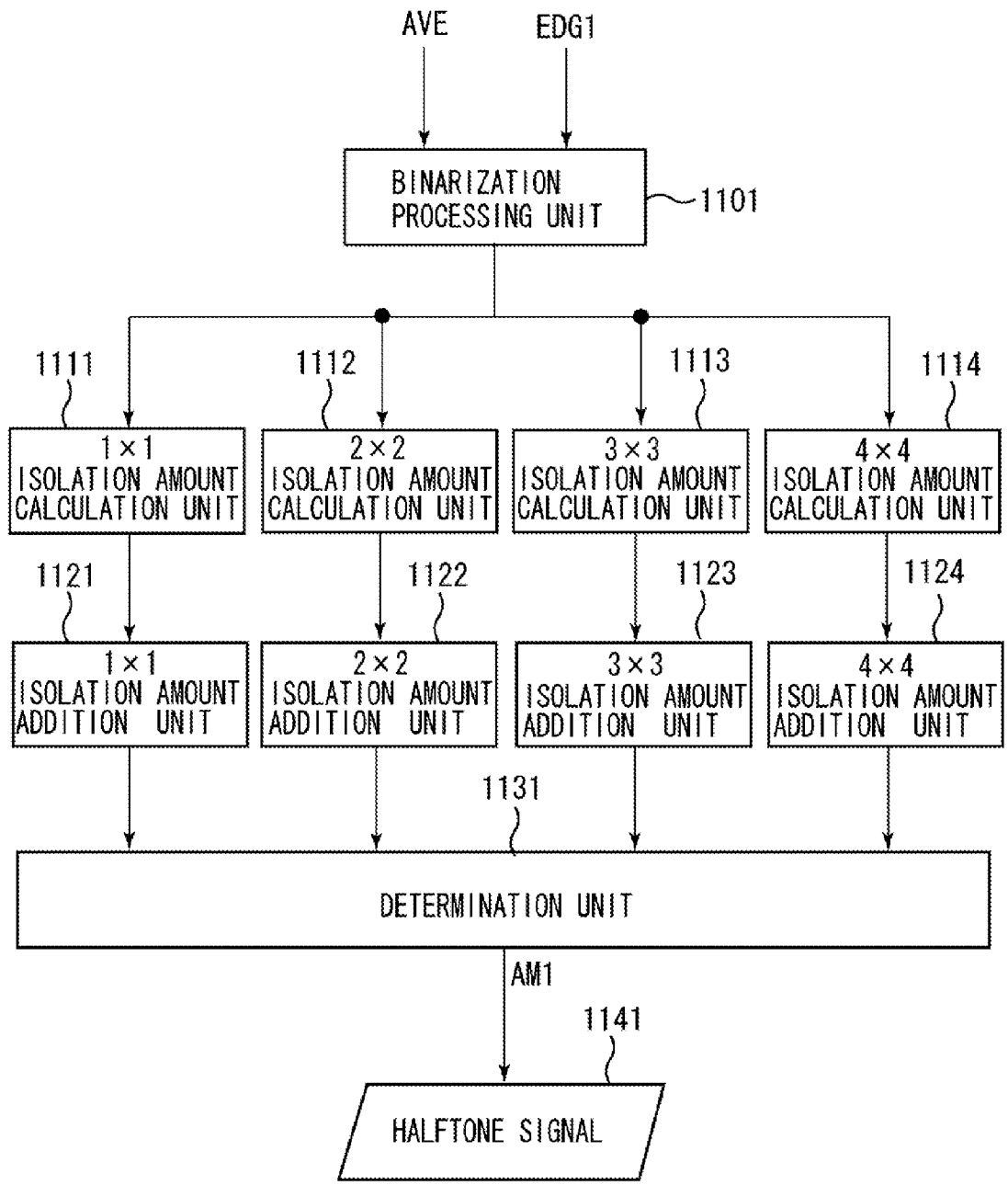
FIG. 11 is a block diagram illustrating example halftone determination processing performed by the region segmentation unit according to an exemplary embodiment of the present invention.

FIG. 11 is a block diagram illustrating an example configuration of the halftone determination unit 1004. A binarization processing unit 1101 receives the calculation and processing results (AVE and EDG1) from the average density calculation unit 1002 and the edge enhancement processing unit 1003. The binarization processing unit 1101 multiples the edge enhancement signal EDG1 by a coefficient A (A is a real number) and compares the multiplied result with the average value AVE. For example, the binarization processing unit 1101 generates a binarized signal in the following manner.

If $A \times EDG1 < AVE$, then binarized signal=1

If $A \times EDG1 \geq AVE$, then binarized signal=0

The binarization processing unit 1101 sends a binarized signal obtained from each pixel to each of a 1×1 isolation amount calculation unit 1111, a 2×2 isolation amount calculation unit 1112, a 3×3 isolation amount calculation unit 1113, and a 4×4 isolation amount calculation unit 1114. The present exemplary embodiment uses a result in the binarization processing to evaluate an isolation state of the target pixel. For example, the 1×1 isolation amount calculation unit 1111 calculates an isolation amount by referring to binarized signals of a 3×3 area including the target pixel at the central position.

If the binarized signal values in the vertical, horizontal, and oblique directions are 0, 1, and 0, the 1×1 isolation amount calculation unit 1111 sets an isolation amount to 1 for each direction and obtains an isolation amount for the target pixel by adding the isolation amounts in respective directions. If the target pixel is highly isolated, the isolation amount becomes 4. If the target pixel is not isolated, the isolation amount becomes 0. When a halftone dot is constituted by one pixel, such as a low-density halftone pixel or a halftone pixel having a higher screen ruling, the isolation amount becomes a relatively large value. Similarly, the 2×2 isolation amount calculation unit 1112, the 3×3 isolation amount calculation unit 1113, and the 4×4 isolation amount calculation unit 1114 compare the binarized signal values with a predetermined pattern and calculate isolation amounts.

The isolation amounts calculated by the 1×1 isolation amount calculation unit 1111, the 2×2 isolation amount calculation unit 1112, the 3×3 isolation amount calculation unit 1113, and the 4×4 isolation amount calculation unit 1114 are input to a 1×1 isolation amount addition unit 1121, a 2×2 isolation amount addition unit 1122, a 3×3 isolation amount addition unit 1123, and a 4×4 isolation amount addition unit 1124, respectively. Each isolation amount addition unit adds the calculated isolation amount in a predetermined area. For example, the 1×1 isolation amount addition unit 1121 adds the isolation amount in a 9×9 area.

A determination unit 1131 receives the addition values calculated by the 1×1 isolation amount addition unit 1121, the 2×2 isolation amount addition unit 1122, the 3×3 isolation amount addition unit 1123, and the 4×4 isolation amount addition unit 1124. The determination unit 1131 performs threshold processing on each input value and generates a halftone signal 1141 by performing majority or logic processing on the obtained results. If an input value is a halftone dot, the determination unit 1131 outputs the halftone signal 1141 indicating AM1=1.

Figure 12:
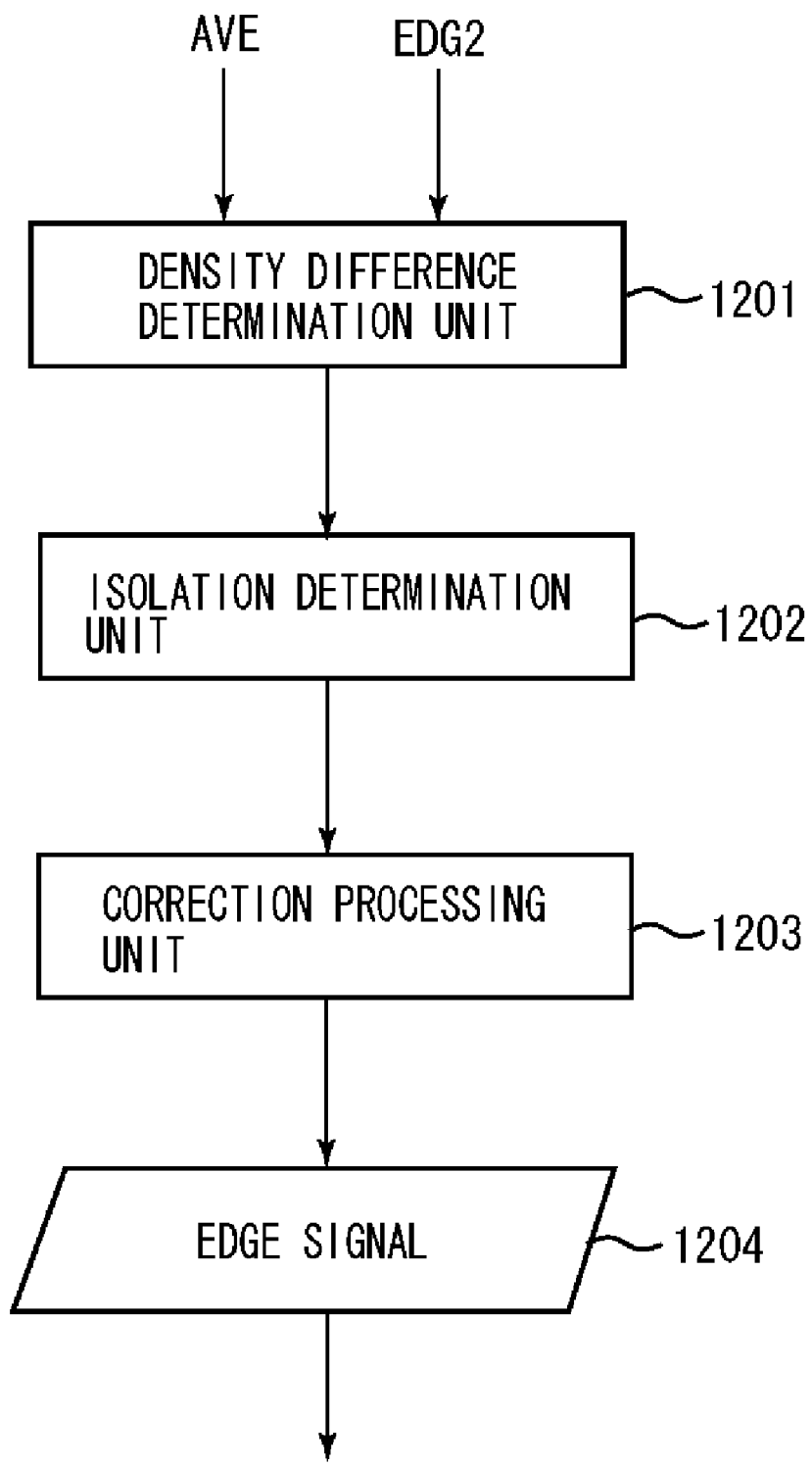
FIG. 12 is a block diagram illustrating example edge determination processing performed by the region segmentation unit according to an exemplary embodiment of the present invention.

FIG. 12 illustrates an example configuration of the edge determination unit 1005. A density difference determination unit 1201 receives the calculation and processing result (AVE and EDG2) from the average density calculation unit 1002 and the edge enhancement processing unit 1003. The density difference determination unit 1201 determines a difference between the edge enhancement signal EDG2 output from the edge enhancement processing unit 1003 and the peripheral area density (AVE). If the difference is greater than a predetermined density difference, the density difference determination unit 1201 outputs a density difference signal of 1. If the difference is less than the predetermined density difference, the density difference determination unit 1201 outputs a density difference signal of 0.

If $AVE - A \times EDG2 > B$, then the density difference signal=1

If $A \times EDG2 - AVE > C$, then the density difference signal=1

Else, the density difference signal=0

(A is a real number, and B and C are a real number or an integer)

An isolation determination unit 1202 receives the density difference signal from the density difference determination unit 1201, and removes an isolation point. For example, the isolation determination unit 1202 refers to the density difference signal in a 7×7 area and, if the "density difference signal=1" is not present on the outer peripheral pixel position, removes the isolation point by forcibly setting the density difference signal in the inner 5×5 area to 0.

A correction processing unit 1203 receives an isolation determination signal output from the isolation determination unit 1202 and corrects a discontinuous portion. For example, the correction processing unit 1203 checks isolation determination signals of respective pixels in a 3×3 area. If the target pixel (positioned at the center of the 3×3 area) has an isolation determination signal of 0 and the upper and lower, right and left, and oblique pixels sandwiching the target pixel has isolation determination signals of 1, the correction processing unit 1203 corrects the isolation determination signal of the target pixel to 1. Thus, the correction processing unit 1203 can generate an edge signal 1204 capable of improving the continuity of a line image if the line image is discontinuous at the target pixel. The line image becomes smooth. If the input value is an edge dot, the correction processing unit 1203 outputs the edge signal 1204 indicating EDGE=1.

Referring back to FIG. 10, a character determination unit 1006 receives the halftone determination signal 1141 and the edge determination signal 1204 output from the halftone determination unit 1004 and the edge determination unit 1005. The character determination unit 1006 processes each input value on a pixel-by-pixel basis. If a processed pixel is not a halftone dot (AM1=0) and an edge dot (EDGE=1), the character determination unit 1006 determines the processed pixel as part of a character and generates a character signal 1007.

The above-described processing is an example image area attribute extraction method realized by the region segmentation unit 92. The above-described exemplary embodiment performs region segmentation processing based on the G channel signals. The present invention is not limited to the G channel and can be applied to signals of any other channel obtained by a central line sensor of a photoelectric conversion element to extract an image area attribute.

The region segmentation processing performed by the region segmentation unit 92 is not limited to the above-described method and can be applied to generation of a character signal based on channel signals obtained by a line sensor disposed on the center of a photoelectric conversion element in the sub scanning direction.

The color determination unit 93 is described in more detail with reference to FIGS. 13 and 16.

Figure 13:
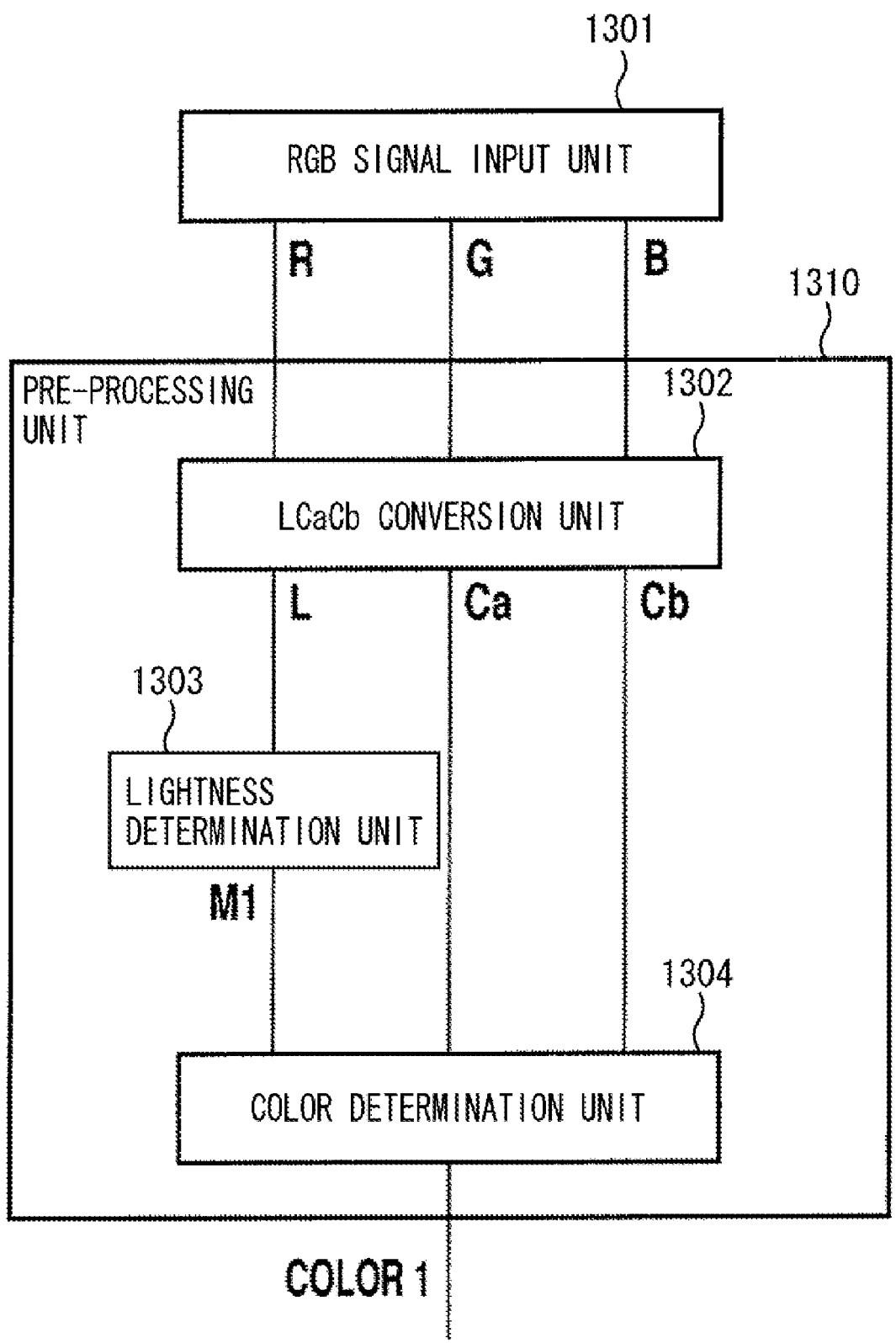
FIG. 13 is a block diagram illustrating example processing performed by a color determination pre-processing unit in a color determination unit according to an exemplary embodiment of the present invention.

FIG. 13 illustrates detailed processing contents of a pre-processing unit 1310 in the color determination unit 93.

An RGB signal input unit 1301 sends R, G, and B multi-valued (each 8-bit) image data to the pre-processing unit 1310, as input signals for the determination. In the present exemplary embodiment, the pre-processing unit 1310 receives three color separation signals R, G, and B from the reading apparatus 91 (serving as a color image input unit).

An LCaCb conversion unit 1302 converts the R, G, and B multi-valued (each 8-bit) image data into a lightness signal L and saturation signals Ca and CB according to the following formulas.

$$L=(R+(2\times G)+B)/4$$

$$Ca=(R-G)/2$$

$$Cb=((R+G)-(2\times B))/4$$

A lightness determination unit 1303 discriminates the level of the lightness signal L referring to two thresholds (Lthre1 and Lthre2) and outputs a lightness determination signal 1 (M1: 2-bit data) according to the following formulae.

If L<Lthre1, then M1=0

Else if L≧Lthre1 and L≦Lthre2, then M1=1

Else M1=2

A color determination unit 1304 classifies the saturation signals Ca and Cb according to the lightness referring to the following conditions, and sets a determination result to a color determination signal (COLOR1: 2-bit data).

When M1=0: If max(abs (Ca), abs (Cb))≦Sthre10, the color determination unit 1304 identifies the input value as monochrome (COLOR1=0) and, otherwise, the color determination unit 1304 identifies the input value as color (COLOR1=1).

When M1=2: If max(abs (Ca), abs (Cb))≦Sthre12, the color determination unit 1304 identifies the input value as monochrome (COLOR1=0) and, otherwise, the color determination unit 1304 identifies the input value as color (COLOR1=1).

When M1=1: If max(abs (Ca), abs (Cb))≦Sthre11, the color determination unit 1304 identifies the input value as monochrome (COLOR1=0) and, if the following conditions 1 to 8 are all satisfied (by AND determination), the color determination unit 1304 identifies the input value as halftone (COLOR1=2) and, otherwise, the color determination unit 1304 identifies the input value as color (COLOR1=1).

$Ca \geq -K1$      Condition 1

$Ca \leq K1$      Condition 2

$Cb \geq -K1$      Condition 3

$Cb \leq K1$      Condition 4

$Cb \geq Ca - J1$      Condition 5

$Cb \leq Ca + J1$      Condition 6

$Cb \geq -(Ca) - J1$      Condition 7

$Cb \leq -(Ca) + J1$      Condition 8

Figure 14:
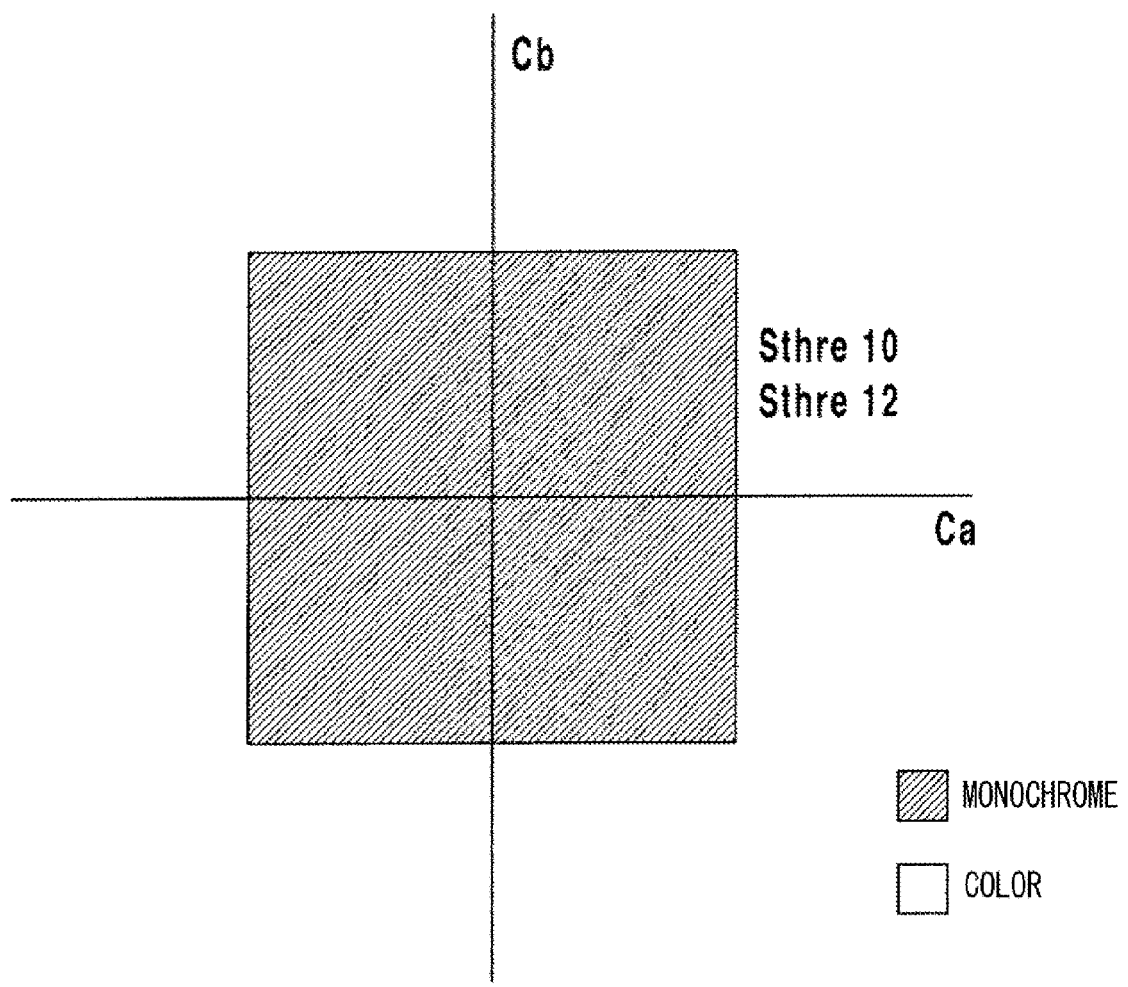
FIG. 14 illustrates example color determination processing on a color space performed by the color determination pre-processing unit according to an exemplary embodiment of the present invention.
Figure 15:
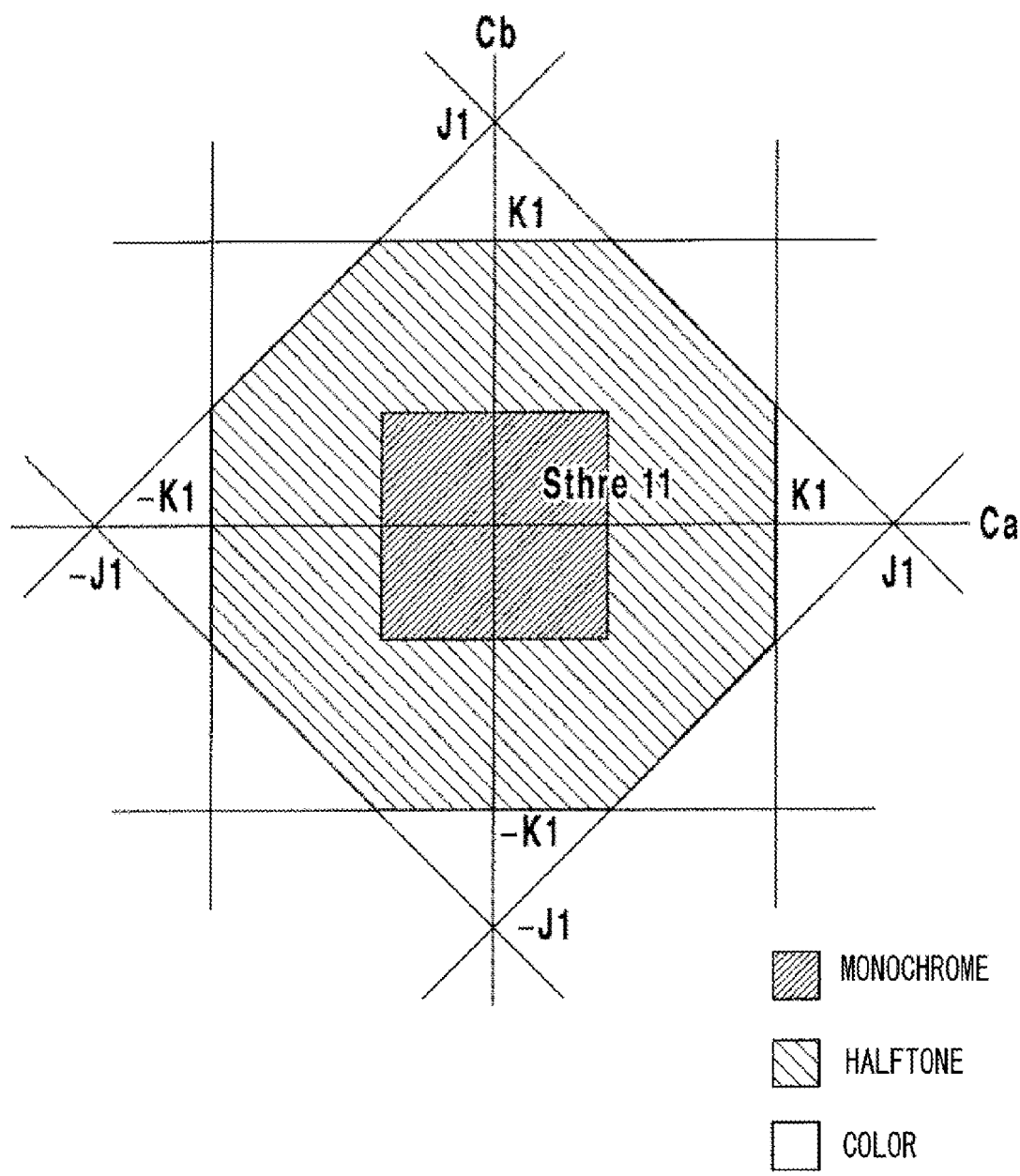
FIG. 15 illustrates example color determination processing on a color space performed by the color determination pre-processing unit according to an exemplary embodiment of the present invention.

More specifically, when M1=0 or M1=2, the color determination unit 1304 classifies the input value into monochrome or color referring to the thresholds Sthre10 and Sthre12 (see FIG. 14). When M1=1, the color determination unit 1304 classifies the input value into monochrome, halftone, or color referring to the threshold Sthre11 and the constants K1 and J1 (see FIG. 15).

The color determination pre-processing unit 1310 collectively performs the above-described processing in the LCaCb conversion unit 1302, the lightness determination unit 1303 and the color determination unit 1304. More specifically, the color determination pre-processing unit 1310 receives image signals R, G, and B of each pixel, determines whether the pixel is monochrome, halftone, or color, and outputs the color determination signal (COLOR1: 2-bit data).

Figure 16:
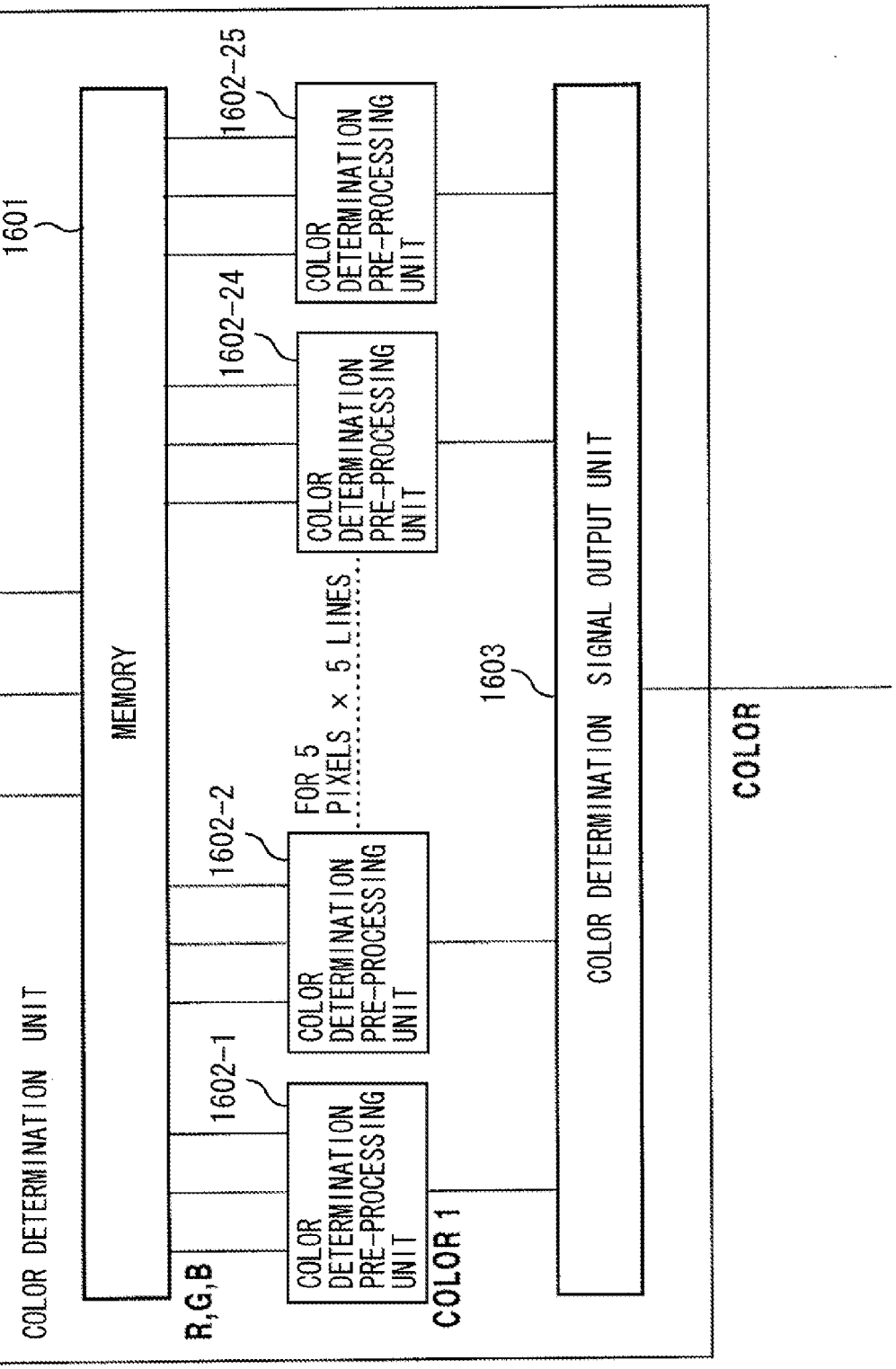
FIG. 16 is a block diagram illustrating example processing performed by the color determination unit according to an exemplary embodiment of the present invention.

FIG. 16 is a block diagram illustrating example processing performed by the color determination unit 93, which outputs a chromatic/achromatic color determination signal COLOR using the color determination pre-processing unit 1310.

The color determination unit 93 performs color determination based on signal values of the image data (R, G, B) in a plurality of areas (5×5 pixels according to the present exemplary embodiment). Therefore, the color determination unit 93 uses a memory 1601 to delay the image data of a plurality of pixels and a plurality of lines. In the present exemplary embodiment, the memory 1601 simultaneously outputs RGB data of 25 (=5×5) pixels.

Figure 17:
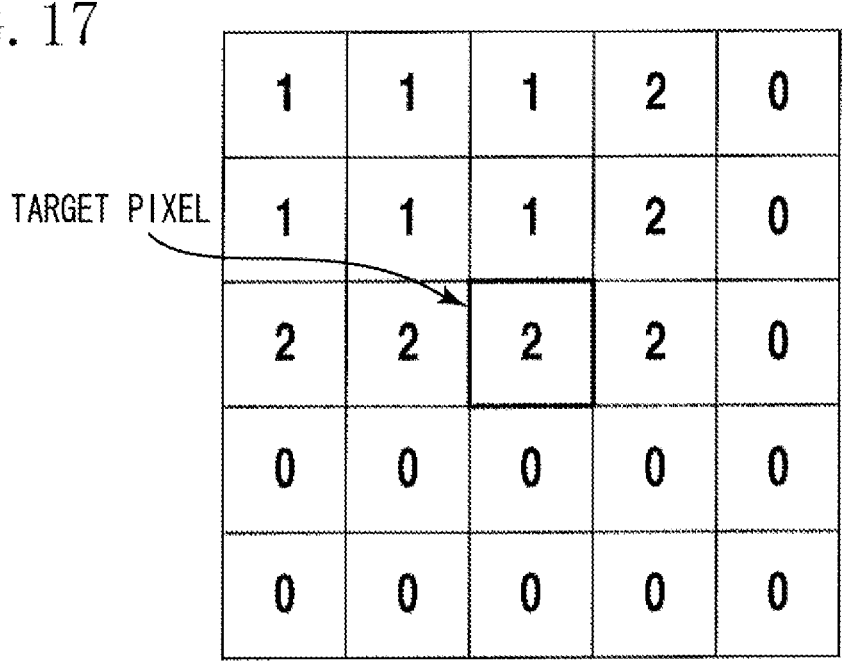
FIG. 17 illustrates detailed processing content of a color determination outputting unit according to an exemplary embodiment of the present invention.

The color determination unit 93 includes a total of 25 color determination pre-processing units 1602-1 to 1602-25 arranged parallel to each other to perform color determination pre-processing for 5×5 pixels, which is similar to the processing performed by the color determination pre-processing unit 1310 illustrated in FIG. 13. FIG. 17 illustrates an example output by the parallel processing, which indicates a determination result of each color determination signal COLOR1 in the 5×5 pixel area including a target pixel positioned at the center thereof.

A color determination signal output unit 1603 outputs a final chromatic/achromatic color determination signal COLOR based on the determination result of the color determination signal COLOR1 in the 5×5 pixel area as described in detail below.

If the target pixel is COLOR1=0, the color determination signal output unit 1603 determines that the target pixel is monochrome (COLOR=0). If the target pixel is COLOR1=1, the color determination signal output unit 1603 determines that the target pixel is color (COLOR=1).

When the target pixel is COLOR1=2 (halftone) and if the 5×5 pixel area of the color determination signal COLOR1 satisfies the following conditions (by AND determination), the color determination signal output unit 1603 determines the target pixel as monochrome (COLOR=0) and, otherwise, as color (COLOR1=1).

$$UP2 \geq ThreU2$$

$$UP1 \geq ThreU1$$

$$DOWN2 \geq ThreD2$$

$$DOWN1 \geq ThreD1$$

Figure 18:
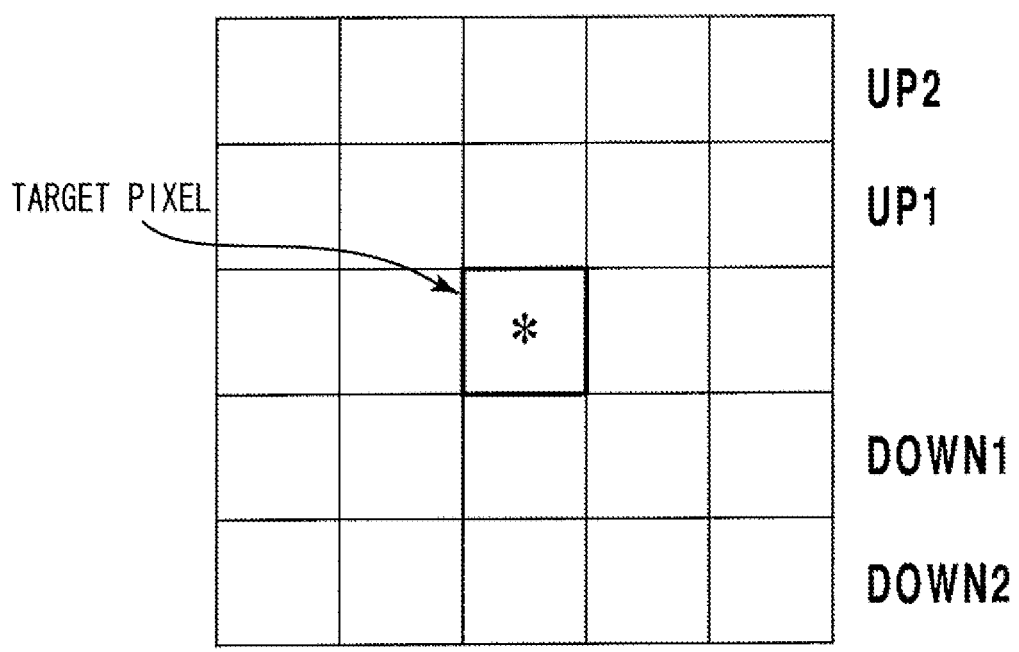
FIG. 18 illustrates detailed processing content of the color determination outputting unit according to an exemplary embodiment of the present invention.

In the above-described conditions, UP2 represents the number of pixels positioned two lines above the target pixel and determined as monochrome, and UP1 represents the number of pixels positioned one line above the target pixel and determined as monochrome. Furthermore, DOWN2 represents the number of pixels positioned two lines below the target pixel and determined as monochrome, and DOWN1 represents the number of pixels positioned one line below the target pixel and determined as monochrome (see FIG. 18).

By performing the above-described determination, the color determination signal output unit 1603 outputs the chromatic/achromatic color determination signal COLOR as a final color determination.

If the color misregistration amount caused by the reading apparatus 91 is large, a highly saturated color blur appears at an achromatic edge portion. If it is required to identify such a pixel in the achromatic color determination, the thresholds Sthre10, Sthre11, and Sthre12 need to be sufficiently large. If larger values are set as these thresholds, a pixel corresponding to a chromatic color portion may be erroneously achromatized. Therefore, it is not desired to increase these thresholds excessively.

The first achromatization unit 94 identifies a pixel to be subjected to achromatization processing in the image read by the reading apparatus 91 based on the character signal 1007 input from the region segmentation unit 92 and the color determination signal COLOR input from the color determination unit 93. More specifically, the first achromatization unit 94 determines to perform achromatization processing on a pixel if the pixel is determined as a character (i.e., edge determined) and achromatic pixel.

If the first achromatization unit 94 receives image data having been converted into L, Ca, and Cb signals from the color determination unit 93 and if the target pixel is to be subjected to the achromatization processing, the first achromatization unit 94 sets Ca and Cb components to be 0. The first achromatization unit 94 generates an attribute signal indicating "processing completed" for a pixel having been subjected to the achromatization processing and outputs the generated attribute signal to the second achromatization processing unit 96.

The pixel of COLOR=0 (i.e., achromatic color) determined by the color determination unit 93 may include data satisfying Ca=0 and Cb=0 (i.e., R=G=B). If the character signal 1007 generated by the region segmentation unit 92 is present in this pixel, the first achromatization unit 94 allocates the "processing completed" attribute signal indicating that the pixel has been achromatized.

The edge extraction unit 95 performs edge extraction on each image data of channels not used by the region segmentation unit 92, among the R, G, and B channels of the image read by the reading apparatus 91. Accordingly, when the region segmentation unit 92 uses G signals, the edge extraction unit 95 performs edge extraction on image data of R and B channels. In this case, the edge extraction unit 95 can perform processing similar to the processing performed by the edge determination unit 1005 in the region segmentation unit 92. Alternatively, the edge extraction unit 95 can extract an edge by performing binarization processing (for comparison with a threshold) using a simple spatial filter of approximately 3×3 pixels.

Figure 19:
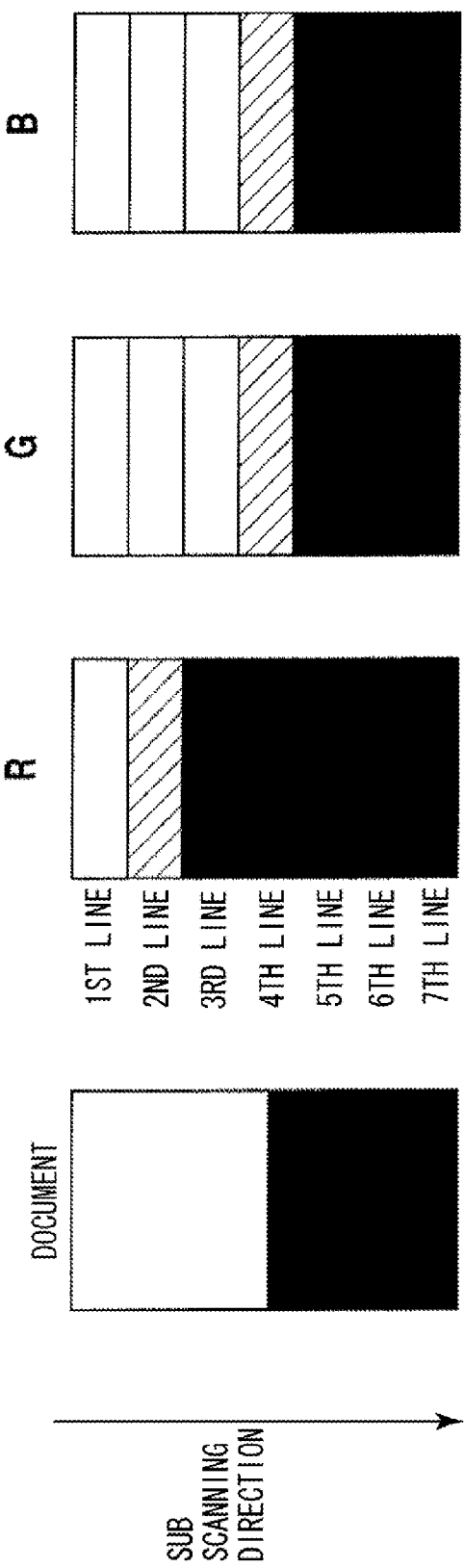
FIG. 19 illustrates R, G, and B reading images in a case where the color misregistration is present.

FIG. 19 illustrates example image data obtained by the line sensors that read an illustrated document, in which a color misregistration is caused in the vicinity of an edge portion corresponding to a boundary between a white area and a thin black line (or a black character region) on the document. According to the example illustrated in FIG. 19, the line sensor (R) 31 reads the edge portion on the document earlier than the line sensor (G) 32 and the line sensor (B) 33 that read the edge portion at normal sampling positions.

At the first line, all channel signals have the same signal level corresponding to a white area. Therefore, a white image can be obtained. The second line is a white area on the document. However, only the R channel generates a signal having a slightly attenuated level. When the R channel signal is combined with G and B channel signals, a light cyan image can be obtained. At the third line, only the R channel signal has a signal level greatly decreased. Therefore, when the R channel signal is combined with the G and B channel signals having read the white area, a highly saturated cyan image can be obtained. At the fourth line, the R channel signal has a signal level greatly decreased while the G and B channel signals have signal levels slightly attenuated. Therefore, when the R channel signal is combined with the G and B channels, a dark cyan image can be obtained. At the fifth line and subsequent lines, all of the R, G, and B channel signals have signal levels greatly decreased. Therefore, when the R, G, and B channel signals are combined, an achromatic dark image can be obtained.

The color misregistration has the above-described effects on image data captured by the line sensors, although the degree of effects is not limited to the above-described example. When the R, G, and B channel signals are randomly misregistered, various color blurs are generated at sampling points. Furthermore, saturation and lightness of a color blur are variable depending on the direction and the amount of the above-described misregistration. Therefore, if the reading apparatus cannot accurately control the color misregistration in both direction and amount, the achromatization processing may not be applied to a large number of pixels because the color determination unit 93 cannot use large thresholds as described above.

It is now assumed that, if the region segmentation unit 92 processes the image illustrated in FIG. 19, the region segmentation unit 92 can detect 3rd, 4th, 5th, and 6th lines as character signals by adjusting its processing parameters. It is further assumed that, if the color determination unit 93 processes the image illustrated in FIG. 19, the color determination unit 93 can determine the 4th, 5th, 6th, and 7th lines as an achromatic area by adjusting its processing parameters. It is generally difficult to determine the third line as an achromatic area because it is a highly saturation blur color.

Figure 20:
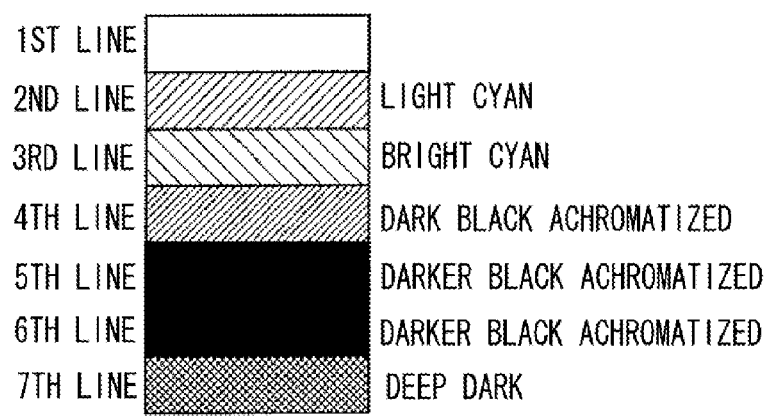
FIG. 20 illustrates an example color image obtained when the color misregistration is present.

FIG. 20 illustrates an example state of image data processed by the first achromatization processing unit 94. The second line is a light cyan color. The third line is a highly saturated cyan color. The fourth line is an achromatized dark color. The fifth and sixth lines are achromatized black colors. The seventh line is an original dark color not processed.

Even after the region segmentation unit 92 completes the character determination, there may be some pixels that have not been subjected to the character determination performed by the region segmentation unit 92 because of excessively high saturation or a great amount of color misregistration.

If the reading result illustrated in FIG. 19 is processed by the edge extraction unit 95, the 1st, 2nd, 3rd, and 4th lines of the R channel are determined as edges and the 3rd, 4th, 5th, and 6th lines of the B channel are determined as edges.

The second achromatization unit 96 receives the region segmentation result (i.e., the character signal 1007) from the region segmentation unit 92, the achromatized result and achromatized image data from the first achromatization unit 94, and the edge information from the edge extraction unit 95. The second achromatization unit 96 performs achromatization processing based on the received data in the following manner.

Figure 21:
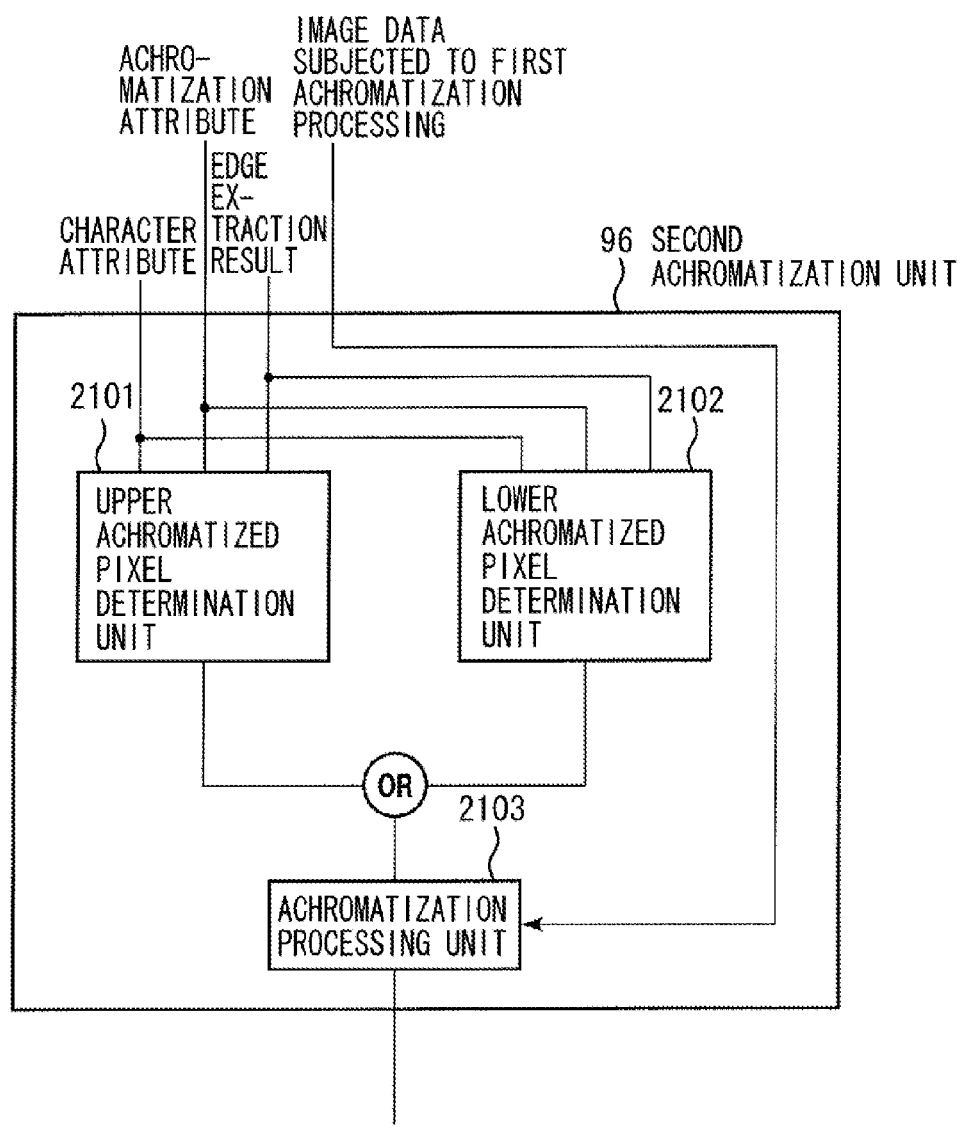
FIG. 21 is a block diagram illustrating example processing performed by a second achromatization unit according to an exemplary embodiment of the present invention.

FIG. 21 is a block diagram illustrating a detailed configuration of the second achromatization unit 96.

An upper achromatized pixel determination unit 2101 searches for an edge of the channel not used by the region segmentation unit 92, within a predetermined distance, among the pixels achromatized by the first achromatization unit 94, positioned on the upstream side in the sub scanning direction. If any edge of the channel not used by the region segmentation unit 92 is present within the predetermined distance, the upper achromatized pixel determination unit 2101 determines achromatization to be applied to an upstream region including the most upstream edge.

A lower achromatized pixel determination unit 2102 searches for an edge of the channel not used by the region segmentation unit 92, within a predetermined distance, among the pixels achromatized by the first achromatization unit 94, positioned on the downstream side in the sub scanning direction. If any edge of the channel not used by the region segmentation unit 92 is present within the predetermined distance, the lower achromatized pixel determination unit 2102 determines achromatization to be applied to a downstream region including the most downstream edge.

After the results from the upper achromatized pixel determination unit 2101 and the lower achromatized pixel determination unit 2102 are processed by OR determination, an achromatization processing unit 2103 sets the saturation components Ca and Cb to 0.

Figure 22:
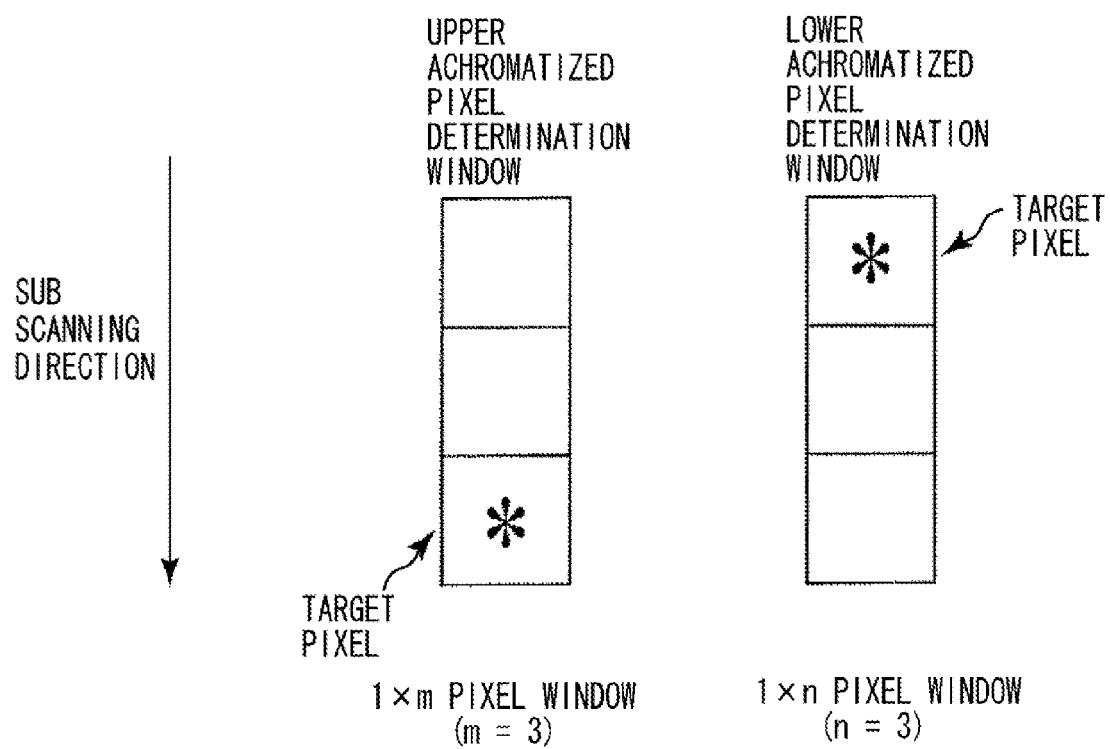
FIG. 22 illustrates example achromatized pixel determination windows of the second achromatization unit according to an exemplary embodiment of the present invention.

FIG. 22 illustrates example edge search windows used by the upper achromatized pixel determination unit 2101 and the lower achromatized pixel determination unit 2102.

The upper achromatized pixel determination unit 2101 performs search processing using a window of 1×m pixels including the target pixel at the lower end thereof. According to the example window illustrated in FIG. 22, m is set to 3 (m=3) although m can be set to an arbitrary integer. The size of the upper achromatized pixel determination window can be determined considering color misregistration characteristics of the reading apparatus 91. In exemplary embodiments, the size is a parameter.

Similarly, the lower achromatized pixel determination unit 2102 performs search processing using a window of 1×n pixels including the target pixel at the upper end thereof. According to the example window illustrated in FIG. 22, n is set to 3 (n=3) although n can be set to an arbitrary integer. The size of the lower achromatized pixel determination window can be determined considering color misregistration characteristics of the reading apparatus 91. In exemplary embodiments, the size is a parameter. Two integers m and n may take values different from each other and can be set independently.

The upper achromatized pixel determination unit 2101 operates in the following manner when the target pixel is already achromatized by the first achromatization unit 94. The upper achromatized pixel determination unit 2101 searches for other pixels in the window and determines whether an edge determination result of the channel not used by the region segmentation unit 92 is present. Then, the upper achromatized pixel determination unit 2101 determines achromatization to be applied to an area in the window extending from the pixel of the uppermost edge to the pixel one line above the target pixel.

If the target pixel is not yet achromatized by the first achromatization unit 94, the upper achromatized pixel determination unit 2101 determines not to change the pixel data in the window.

FIG. 23 illustrates image data obtained when the upper achromatized pixel determination unit 2101 performs processing on the image illustrated in FIG. 20 (i.e., the image data processed by the first achromatization processing unit 94).

The fourth line is already achromatized by the first achromatization unit 94. When the window of the upper achromatized pixel determination unit 2101 is placed on the fourth line, the uppermost edge can be detected as an R channel edge positioned on the second line. Therefore, in this case, the second line and the third line become objects to be subjected to the achromatized pixel determination performed by the second achromatization processing unit 96.

The lower achromatized pixel determination unit 2102 operates in the following manner when the target pixel is already achromatized by the first achromatization unit 94. The lower achromatized pixel determination unit 2102 searches for other pixels in the window and determines whether an edge determination result of the channel not used by the region segmentation unit 92 is present. Then, the lower achromatized pixel determination unit 2102 determines achromatization to be applied to an area in the window extending from the pixel of the lowermost edge to the pixel one line below the target pixel.

If the target pixel is not yet achromatized by the first achromatization unit 94, the lower achromatized pixel determination unit 2102 determines not to change the pixel data in the window.

Although not illustrated, the lower achromatized pixel determination unit 2102 performs processing similar to that of the upper achromatized pixel determination unit 2101.

The determination results of the upper achromatized pixel determination unit 2101 and the lower achromatized pixel determination unit 2102 are OR calculated. A pixel to be achromatized is finally determined. The achromatization processing unit 2103 sets the saturation components Ca and Cb to 0.

An LCaCb signal can be finally obtained after completing the processing of the second achromatization unit 96. The obtained LCaCb signal can be converted into an RGB signal at an input stage of a subsequent image processing stage. Then, the achromatization processed pixel representing an achromatic color of R=G=B can be sent to subsequent image processing stages.

As a result of the above-described processing performed in each block, a color blur portion of an edge portion of an achromatic portion on a document, which is caused by the color misregistration, can be achromatized. In this case, if the color misregistration amount is small, an influence range of the achromatization processing can be narrowed by the processing of the second achromatization processing unit 96. If the color misregistration amount is large, the achromatization processing can be performed according to the color misregistration amount.

In other words, the above-described exemplary embodiment can change the influence range of the achromatization processing so as to follow up the color misregistration amount randomly appearing during a document reading operation.

Figure 3:
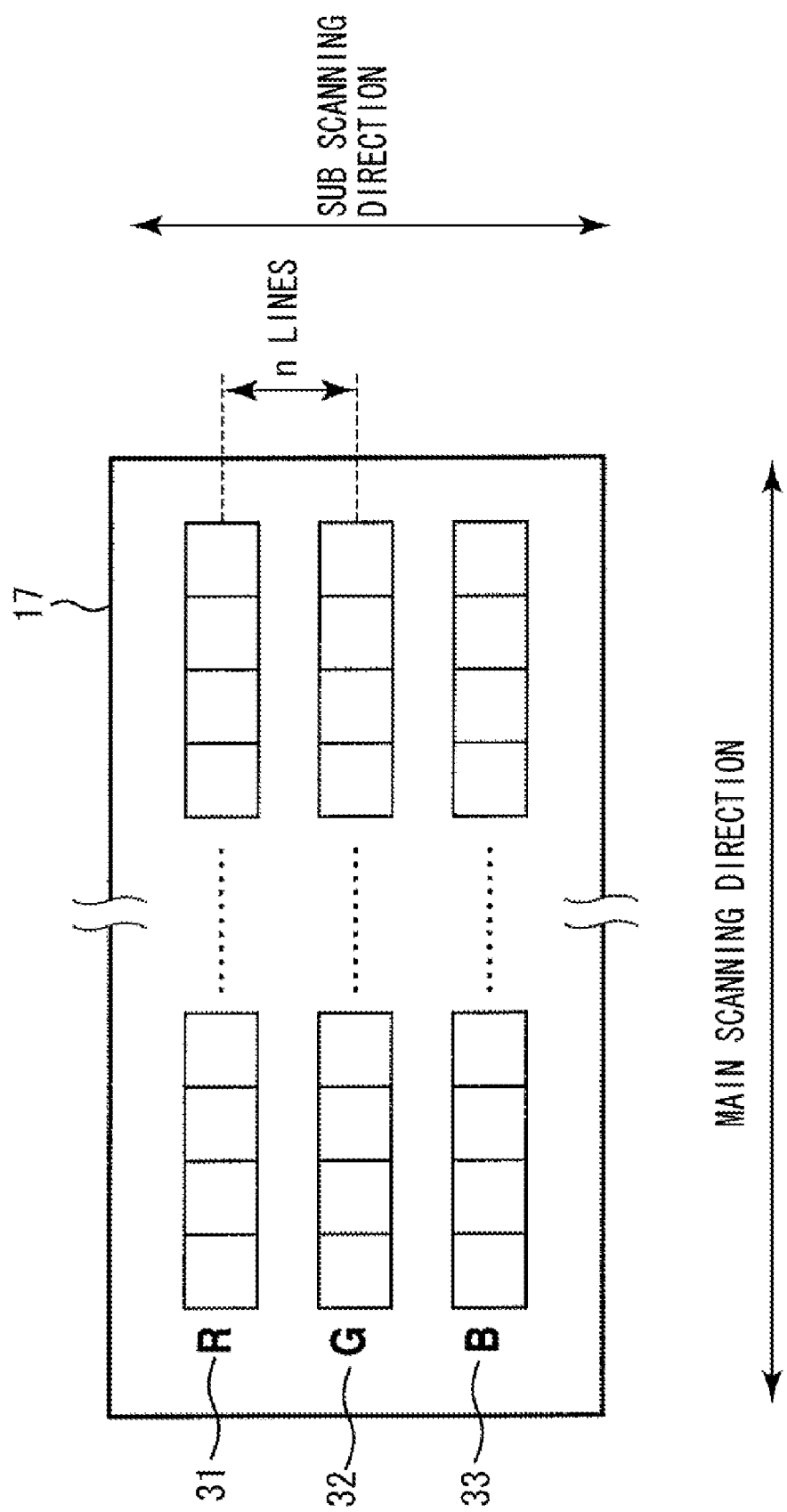
FIG. 3 illustrates a representative photoelectric conversion element.
Figure 4:
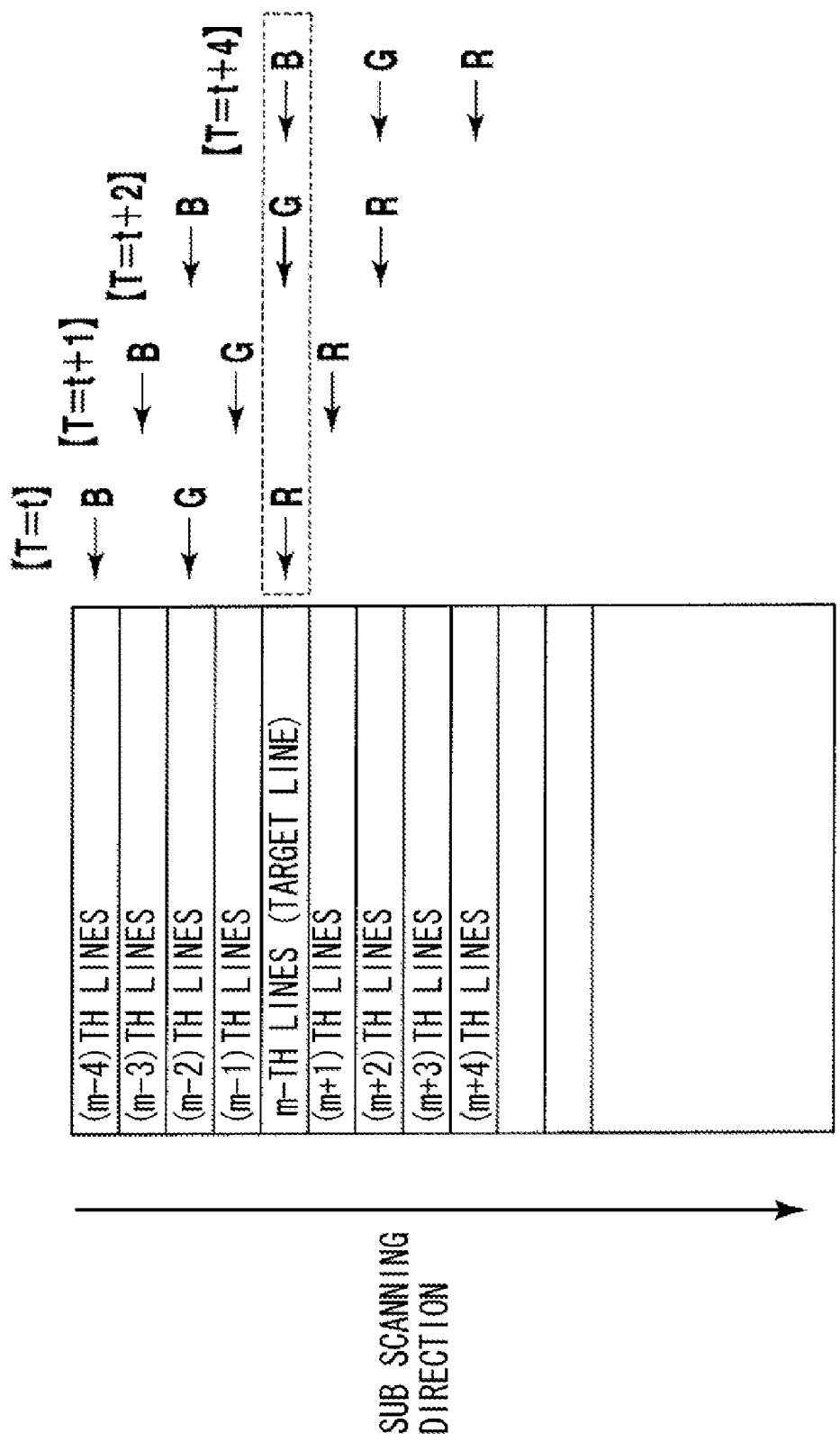
FIG. 4 illustrates an example RGB image capturing method using three line sensors.
Figure 5:
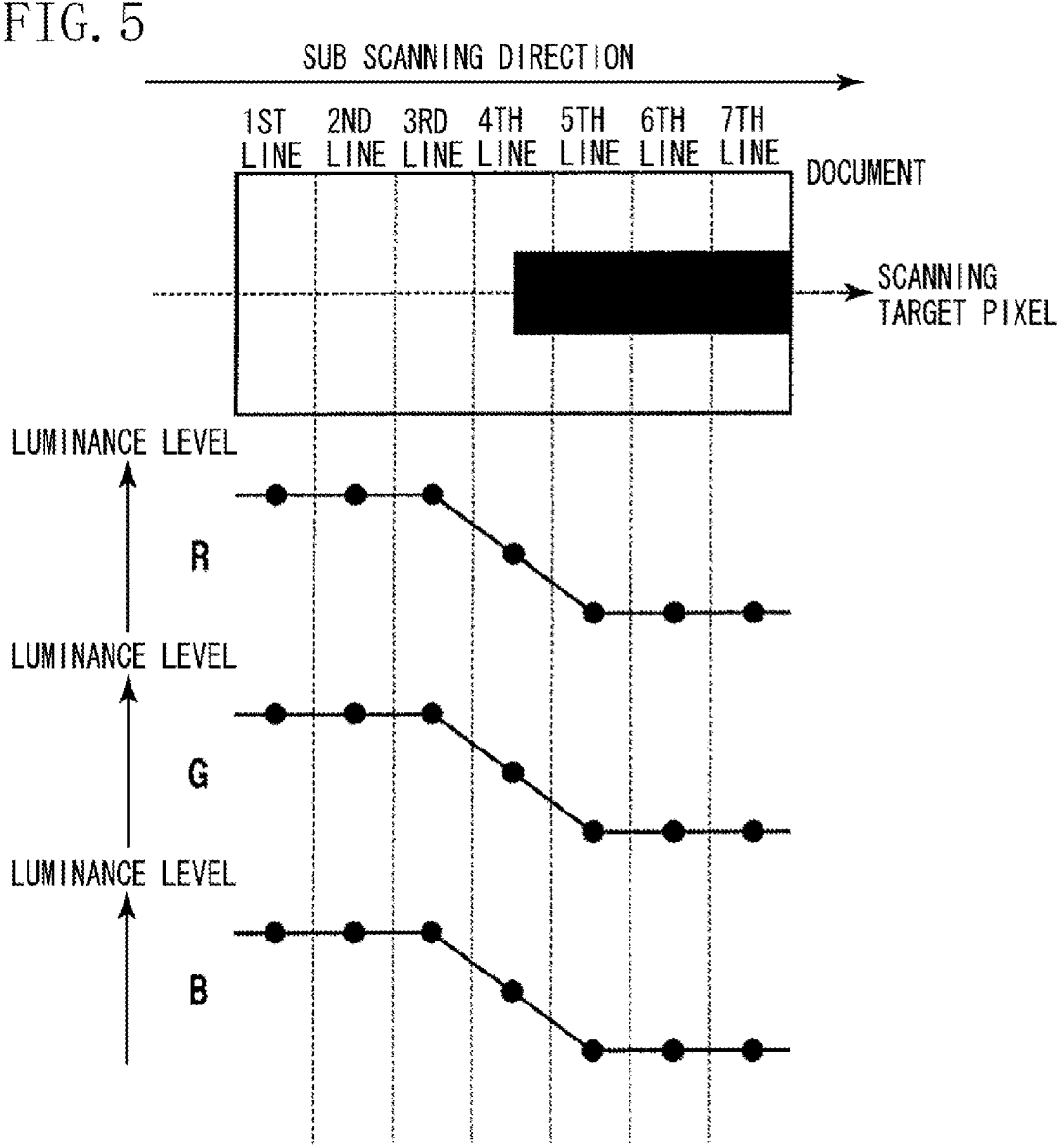
FIG. 5 illustrates example R, G, and B luminance levels in a case where no color misregistration is present.
Figure 6:
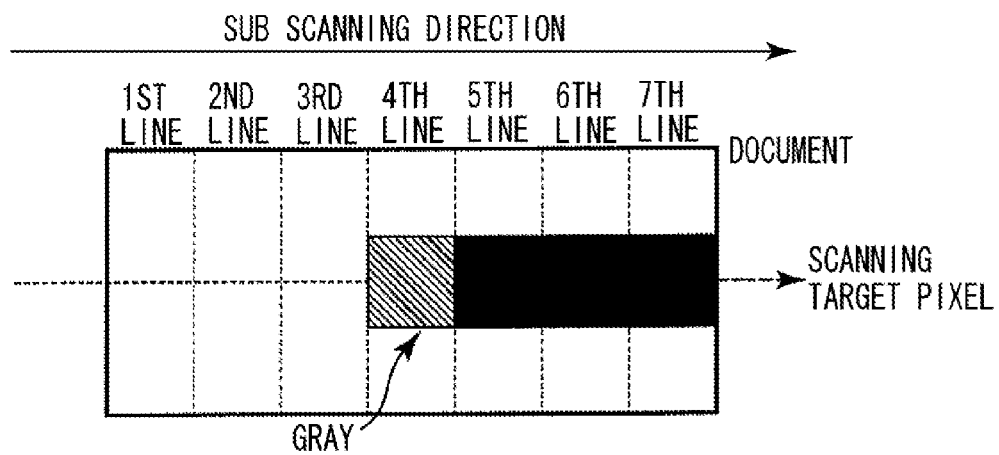
FIG. 6 illustrates an example RGB image obtained by the image reading operation illustrated in FIG. 5.
Figure 7:
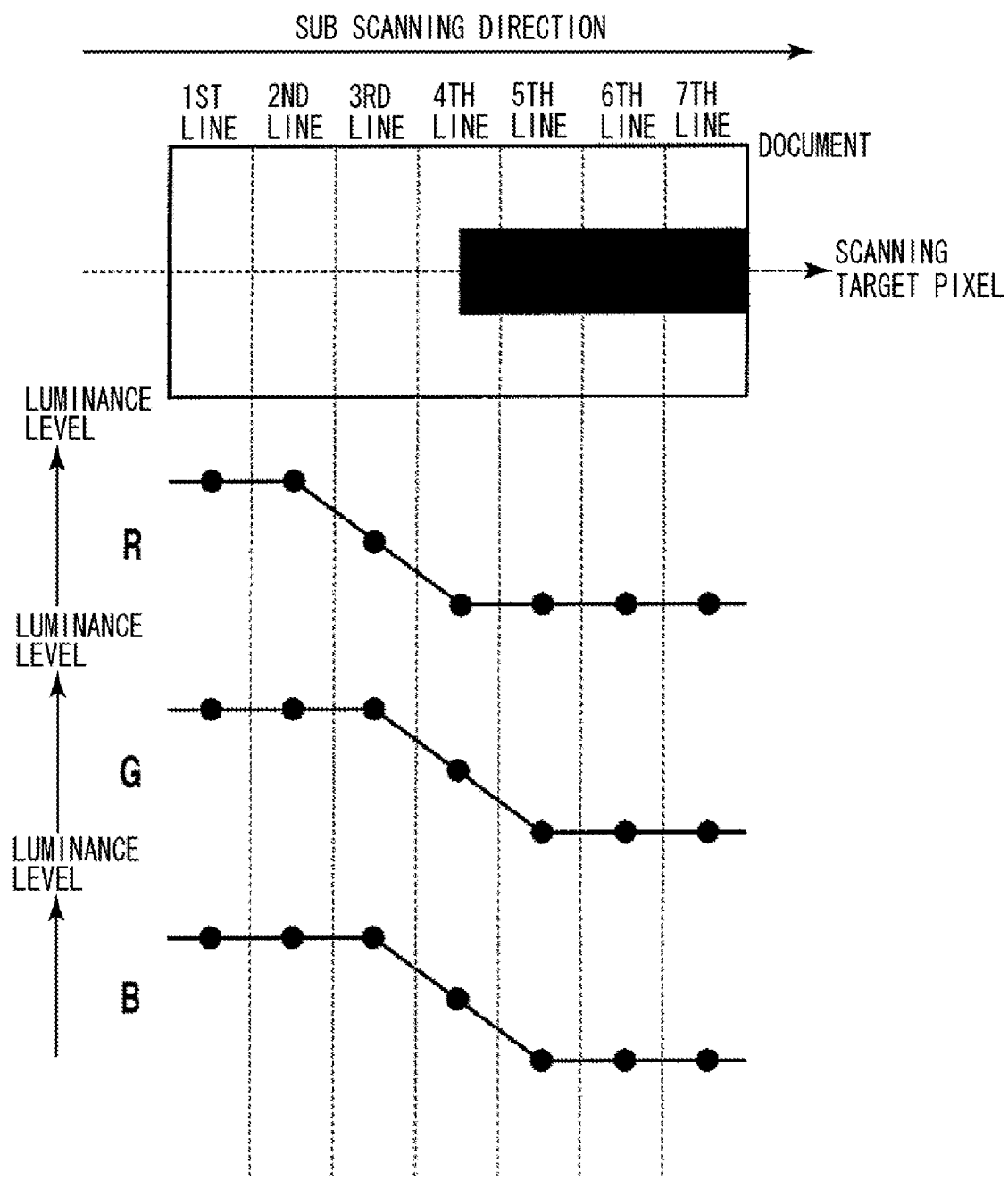
FIG. 7 illustrates example R, G, and B luminance levels in a case where the color misregistration is present.
Figure 8:
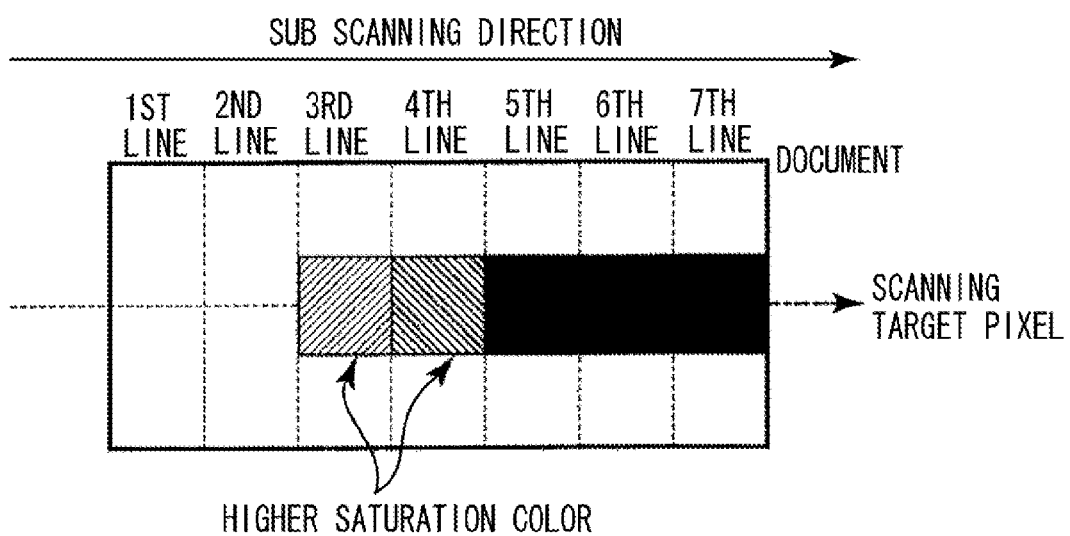
FIG. 8 illustrates an example RGB image obtained by the image reading operation illustrated in FIG. 7.

When the line sensor (R) 31, the line sensor (G) 32, and the line sensor (B) 33 are arranged as illustrated in FIG. 3, the region segmentation unit 92 detects an edge of the G channel while the edge extraction unit 95 detects edges of the R and B channels. However, if a device having a different line sensor arrangement is used, the region segmentation unit 92 can detect an edge of the central line sensor and the edge extraction unit 95 can detect edges of the remaining (two) line sensors of other channels.

The present invention can be applied to a system including a plurality of devices (a host computer, an interface device, a reader, a printer, etc.) or can be applied to a single device (e.g., a copying machine or a facsimile apparatus).

Furthermore, software program code for realizing the functions of the above-described exemplary embodiments can be supplied to a computer of an apparatus or a system connected to various devices to operate the devices so as to realize the functions of the above-described exemplary embodiments. The computer (e.g., central processing unit (CPU) or microprocessing unit (MPU)) in the system or the apparatus can execute the program to operate the devices to realize the functions of the above-described exemplary embodiments.

In this case, the program code itself can realize the functions of the exemplary embodiments. The equivalents of programs are usable if they possess comparable functions. Furthermore, the present invention encompasses a means, such as a storage (or recording) medium storing the program code, which can supply the program code to a computer.

A storage medium storing the program can be, for example, a floppy disk, a hard disk, an optical disk, a magneto-optical (MO) disk, a compact disc-ROM (CD-ROM), a CD-recordable (CD-R), a CD-rewritable (CD-RW), a magnetic tape, a nonvolatile memory card, a ROM, and a DVD (DVD-ROM, DVD-R).

Moreover, the program code according to the exemplary embodiments of the present invention can cooperate with an operating system (OS) or other application software running on a computer to realize the functions of the above-described exemplary embodiments.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or all of the processing to realize the functions of the above-described exemplary embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-015511 filed Jan. 25, 2008, which is hereby incorporated by reference herein in its entirety.

What is claimed is:

1. An image processing apparatus comprising:
    a color determination unit configured to determine saturation of each pixel in RGB image data;
    a first edge determination unit configured to determine whether each pixel belongs to an edge region of a G signal of the RGB image data;
    a first achromatization unit configured to achromatize a pixel in a case that the saturation of the pixel is less than a predetermined value and the pixel belongs to the edge region of the G signal to obtain corrected RGB image data;
    a second edge determination unit configured to determine whether each pixel belongs to an edge region of an R signal of the RGB image data and whether each pixel belongs to an edge region of a B signal of the RGB image data; and
    a second achromatization unit configured to achromatize a pixel of the corrected RGB image data in a case that (1) the pixel belongs to the edge region of the R signal, (2) the pixel belongs to the edge region of the B signal, (3) the pixel is within a predetermined distance from the pixel achromatized by the first achromatization unit.

2. A method for processing an image comprising:
    performing a color determination for determining saturation of each pixel in RGB image data;
    performing a first edge determination to determine whether each pixel belongs to an edge region of a G signal of the RGB image data;
    performing a first achromatization for achromatizing a pixel in a case that the saturation of the pixel is less than a predetermined value and the pixel belongs to the edge region of the G signal to obtain corrected RGB image data;
    performing a second edge determination for determining whether each pixel belongs to an edge region of an R signal of the RGB image data and whether each pixel belongs to an edge region of a B signal of the RGB image data; and
    performing a second achromatization for achromatizing a pixel of the corrected RGB image data in a case that (1) the pixel belongs to the edge region of the R signal, (2) the pixel belongs to the edge region of the B signal, (3) the pixel is within a predetermined distance from the pixel achromatized by the first achromatization.

* * * * *